US011567238B2

(12) United States Patent
Saneto et al.

(10) Patent No.: US 11,567,238 B2
(45) Date of Patent: Jan. 31, 2023

(54) LAMINATE, ANTIREFLECTION PRODUCT HAVING THREE-DIMENSIONAL CURVED SURFACE, AND METHOD OF MANUFACTURING ANTIREFLECTION PRODUCT

(71) Applicant: FUJIFILM Corporation, Tokyo (JP)

(72) Inventors: Ryuji Saneto, Kanagawa (JP); Shuntaro Ibuki, Kanagawa (JP); Shusuke Arita, Kanagawa (JP); Yuta Fukushima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 200 days.

(21) Appl. No.: 16/564,577

(22) Filed: Sep. 9, 2019

(65) Prior Publication Data

US 2019/0391297 A1    Dec. 26, 2019

Related U.S. Application Data

(63) Continuation of application No. PCT/JP2018/012562, filed on Mar. 27, 2018.

(30) Foreign Application Priority Data

Apr. 3, 2017  (JP) .............................. JP2017-074005
May 19, 2017  (JP) .............................. JP2017-100052

(51) Int. Cl.
*G02B 1/118*  (2015.01)

(52) U.S. Cl.
CPC ....... *G02B 1/118* (2013.01); *Y10T 428/24372* (2015.01)

(58) Field of Classification Search
CPC .... G02B 1/118; G02B 5/0294; G02B 5/0247; B32B 3/30; Y10T 428/24372
See application file for complete search history.

(56) References Cited

U.S. PATENT DOCUMENTS

2015/0253466 A1*  9/2015  Ibuki .................... G02B 5/3033
                                                      359/488.01
2016/0077240 A1*  3/2016  Asahi .................. G02B 5/0294
                                                      428/331
(Continued)

FOREIGN PATENT DOCUMENTS

JP        2010-164824 A     7/2010
JP        2016-061794 A     4/2016
(Continued)

OTHER PUBLICATIONS

International Search Report Issued in PCT/JP2018/012562 dated Jun. 19, 2018.
(Continued)

*Primary Examiner* — Nancy R Johnson
(74) *Attorney, Agent, or Firm* — Edwards Neils LLC; Jean C. Edwards, Esq.

(57) ABSTRACT

A laminate includes a substrate; and a layer (a) containing particles forming a specific uneven shape, the number of particles present on the surface of the layer (a) is 6.3 to 20 per 1 μm², and a heat shrinkage rate of the laminate in a case of being heated for one hour at a glass transition temperature of the substrate+10° C. is 20% or more and less than 70%. An antireflection product has a three-dimensional curved surface having a curvature radius of 1 to 1,000 mm, and has a specific uneven shape formed of particles on the three-dimensional curved surface, the number of metal oxide particles present on the three-dimensional curved surface is 9 to 40 per 1 μm², and a difference between a maximum value and a minimum value of reflectivities is less than 1.2%.

17 Claims, 2 Drawing Sheets

(56) References Cited

U.S. PATENT DOCUMENTS

| | | | |
|---|---|---|---|
| 2016/0103249 A1 | 4/2016 | Sato et al. | |
| 2016/0131802 A1* | 5/2016 | Mizoshita | G02B 1/11 359/601 |
| 2017/0015087 A1* | 1/2017 | Asahi | B29D 11/00865 |

FOREIGN PATENT DOCUMENTS

| | | |
|---|---|---|
| JP | 2016-075869 A | 5/2016 |
| WO | 2015/146676 A1 | 10/2015 |
| WO | 2015/152308 A1 | 10/2015 |

OTHER PUBLICATIONS

Written Opinion Issued in PCT/JP2018/012562 dated Jun. 19, 2018.
International Preliminary Report on Patentability Issued in PCT/JP2018/012562 dated Oct. 8, 2019.

* cited by examiner

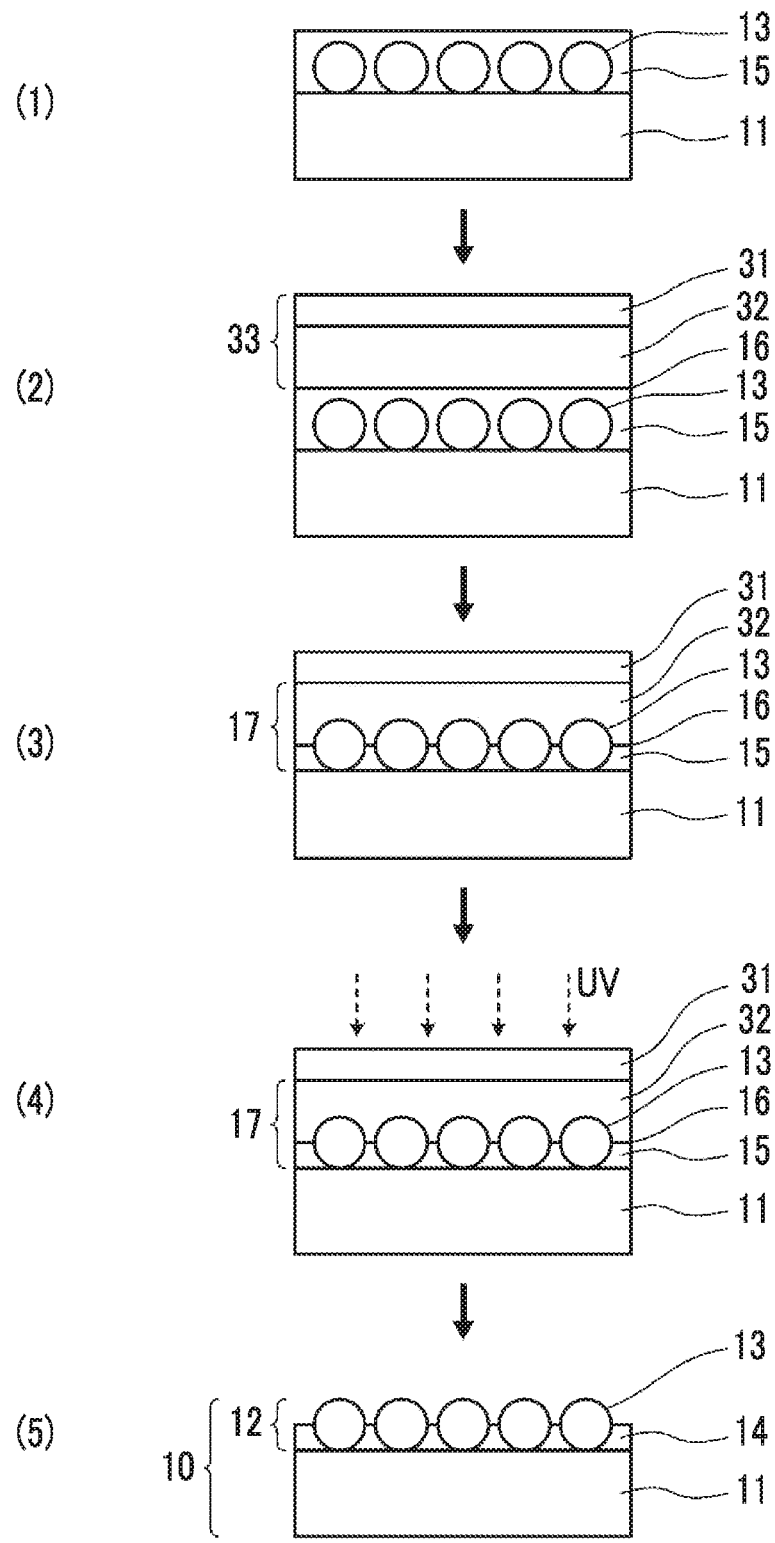

LAMINATE, ANTIREFLECTION PRODUCT HAVING THREE-DIMENSIONAL CURVED SURFACE, AND METHOD OF MANUFACTURING ANTIREFLECTION PRODUCT

CROSS-REFERENCE TO RELATED APPLICATIONS

This application is a Continuation of PCT International Application No. PCT/JP2018/012562, filed on Mar. 27, 2018, which was published under PCT Article 21(2) in Japanese, and which claims priority under 35 U.S.C. § 119(a) to Japanese Patent Application No. 2017-074005, filed on Apr. 3, 2017 and Japanese Patent Application No. 2017-100052, filed on May 19, 2017. The above applications are hereby expressly incorporated by reference, in their entirety, into the present application.

BACKGROUND OF THE INVENTION

1. Field of the Invention

The present invention relates to a laminate, an antireflection product having a three-dimensional curved surface, and a method of manufacturing an antireflection product.

2. Description of the Related Art

In an image display device such as a display device using a cathode ray tube (CRT), a plasma display panel (PDP), an electroluminescent display (ELD), a vacuum fluorescent display (VFD), a field emission display (FED), and the liquid crystal display device (LCD), an antireflection film may be provided in order to prevent decrease in the contrast due to reflection of external light on a display surface and reflected glare of an image.

As the antireflection film, various aspects of antireflection films have been proposed, but as one aspect thereof, an antireflection film having a fine uneven shape with a period of less than or equal to the wavelength of visible light on the surface of the substrate, a so-called antireflection films having a moth eye structure is known. The moth eye structure makes a refractive index gradient layer in which the refractive index continuously changes in a pseudo manner from the air toward the bulk material inside the substrate, and reflection of the light can be prevented.

JP2010-164824A discloses an antireflection film comprising a plurality of antireflection layers containing fine particles and a binder on a substrate formed of an acrylic resin, and having protrusions formed by causing fine particles to protrude from the surface of the antireflection layer on the surface opposite to the substrate.

JP2016-075869A discloses a flexible display device in which an antireflection film provided with an antireflection layer containing inorganic fine particles and a matrix resin on at least one surface of a flexible transparent resin film substrate is disposed on an image display surface.

SUMMARY OF THE INVENTION

Recently, it has been required to provide an antireflection function even to a product having a three-dimensional curved surface.

However, JP2010-164824A does not disclose application of the antireflection film to a product having a three-dimensional curved surface. JP2016-075869A discloses a flexible display device that does not generate cracks in a case where a bending test is performed by using a cylindrical mandrel with a radius of 2 mm, but this merely discloses a degree of bending the antireflection film but does not intend the application to a product having a three-dimensional curved surface. The antireflection film disclosed in JP2016-075869A has high reflectivity and antireflection performance may not be sufficient.

The present inventors have conducted research on the application of an antireflection film to a product having a three-dimensional curved surface, to find that it was difficult to molded an antireflection film in the related art into a shape having a three-dimensional curved surface, and even in a case where the antireflection film was able to be molded into a shape having a three-dimensional curved surface, reflectivity increases or the reflectivity unevenness increases. The reflectivity unevenness refers to a difference between the maximum value and the minimum value of the reflectivity.

The present invention has been conceived in view of the above circumstances, and an object thereof is to provide a laminate that can be molded into a shape having a three-dimensional curved surface and that can provide an antireflection product having a three-dimensional curved surface with a low reflectivity and small reflectivity unevenness, the antireflection product having a three-dimensional curved surface, and a method of manufacturing the antireflection product.

The present inventors have diligently conducted research to find that the following objects can be achieved by the following means.

<1> A laminate comprising:
a substrate; and
a layer (a) containing a binder resin and particles,
in which the layer (a) has an uneven shape formed of the particles on a surface opposite to the substrate,
in the uneven shape, B/A which is a ratio of a distance A between peaks of adjacent protrusions and a distance B between a center between the peaks of the adjacent protrusions and a recessed part is 0.35 or more,
the number of particles present on the surface of the layer (a) opposite to the substrate is 6.3 to 20 per 1 $\mu m^2$, and
a heat shrinkage rate of the laminate in a case of being heated for one hour at a glass transition temperature of the substrate+10° C. is 20%0 or more and less than 70%.

<2> The laminate according to <1>, in which heating was performed for one hour at the glass transition temperature of the substrate+10° C., a heat shrinkage rate of the substrate is 20% or more and less than 70%.

<3> The laminate according to <1> or <2>, in which a growth rate of the binder resin is 10% or more.

<4> The laminate according to any one of <1> to <3>, in which a hard coat layer is provided between the substrate and the layer (a).

<5> The laminate according to <4>, in which a growth rate of the hard coat layer is 10% or more.

<6> The laminate according to any one of <1> to <5>, in which an average primary particle diameter of the particles is 250 nm or less.

<7> The laminate according to any one of <1> to <6>, in which the number of particles present on a surface of the layer (a) opposite to the substrate is 7 to 16 per 1 $\mu m^2$n.

<8> An antireflection product having a three-dimensional curved surface, in which a minimum curvature radius of the three-dimensional curved surface is 1 to 1,000 mm.

An uneven shape formed of particles is provided on the three-dimensional curved surface, in the uneven shape, $B_2/A_2$ which is a ratio of a distance $A_2$ between peaks of adjacent protrusions and a distance $B_2$ between a center between the peaks of the adjacent protrusions and a recessed part is 0.4 or more, the number of particles present on the three-dimensional curved surface is 9 to 40 per 1 μm², and a difference between the maximum value and the minimum value of the reflectivity on the three-dimensional curved surface is less than 1.2%, here, the reflectivity is an average value of values obtained by measuring a range of wavelengths of 450 nm to 650 nm at an interval of 5 nm.

<9> An antireflection product having a three-dimensional curved surface according to <8>, in which an average primary particle diameter of the particles is 250 nm or less.

<10> A method of manufacturing an antireflection product having a three-dimensional curved surface, comprising:

a step of pasting the laminate according to any one of <1> to <7> so as to cover at least a portion of the three-dimensional curved surface of the product having a three-dimensional curved surface, and a step of heating the product to which the laminate is pasted at a temperature of the glass transition temperature or more of the substrate of the laminate or more.

According to the present invention, it is possible to provide a laminate that can be molded into a shape having a three-dimensional curved surface and that can provide an antireflection product having a three-dimensional curved surface with a low reflectivity and small reflectivity unevenness, the antireflection product having a three-dimensional curved surface, and a method of manufacturing the antireflection product.

BRIEF DESCRIPTION OF THE DRAWINGS

FIG. 2 is a schematic cross-sectional view illustrating a method of manufacturing a laminate according to the embodiment of the present invention.

DESCRIPTION OF THE PREFERRED EMBODIMENTS

Figure 1:
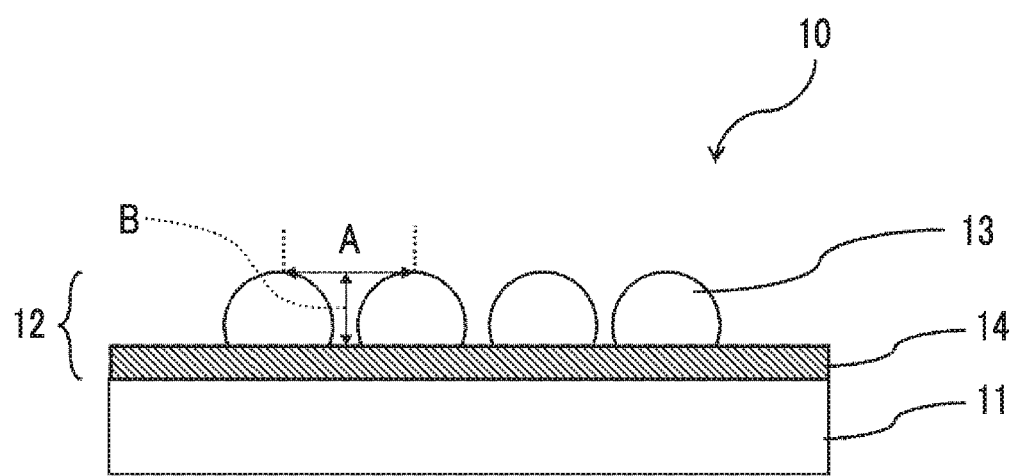
FIG. 1 is a schematic cross-sectional view of a laminate according to an embodiment of the present invention.

Hereinafter, a preferable embodiment of the present invention is specifically described. The following description of configuration requirements may be made based on a representative embodiment of the present invention, but the present invention is not limited to the embodiment.

In the present specification, in a case where the description that a numerical value range is "(numerical value 1) to (numerical value 2)", the description means that "(numerical value 1) or more and (numerical value 2) or less".

"(Meth)acrylate" refers to at least one of acrylate or methacrylate, "(meth)acryl" refers to at least one of acryl or methacryl, and "(meth)acryloyl" refers to at least one of acryloyl or methacryloyl.

[Laminate]

The laminate of the present invention is a laminate having a substrate and a layer (a) containing a binder resin and particles, the layer (a) has an uneven shape formed of the particles on the surface opposite to the substrate, In the uneven shape, B/A which is the ratio of a distance A between peaks of adjacent protrusions and a distance B between a center between peaks of adjacent protrusions and a recessed part is 0.35 or more.

the number of particles present on the surface opposite to the substrate of the layer (a) is 6.3 or more and 20 or less per 1 μm², and a heat shrinkage rate in a case of being heated at the glass transition temperature of the substrate+10° C. for one hour was 20% or more and less than 70%.

The laminate according to the embodiment of the present invention can be molded into a shape having a three-dimensional curved surface, and in a case of using the laminate according to the embodiment of the present invention, it is possible to provide an antireflection product having a three-dimensional curved surface which has low reflectivity and small reflectivity unevenness. Specifically, for example, it is possible to obtain a laminate formed in a moth eye structure on a three-dimensional curved surface by molding the laminate according to the embodiment of the present invention while being shrunk by heat according to a shape of the product having a three-dimensional curved surface, and it is possible to manufacture an antireflection product having a three-dimensional curved surface in which a moth eye structure is formed on a three-dimensional curved surface, the reflectivity is low and reflectivity unevenness is small, by pasting the laminate to a product having the three-dimensional curved surface or pasting the laminate according to the embodiment of the present invention so as to cover at least a portion of the three-dimensional curved surface of the product having a three-dimensional curved surface. The laminate according to the embodiment of the present invention is a "precursor of the antireflection laminate" for forming the antireflection laminate to be disposed on the surface of the product having a three-dimensional curved surface. The layer (a) is a layer for forming the antireflection layer.

In a case where the laminate according to the embodiment of the present invention is used, and molding is performed into a shape having a three-dimensional curved surface, the shape of the layer (a) of the laminate may be a convex shape or a concave shape.

The three-dimensional curved surface refers to a curved surface which is not a developable surface. A developable surface is a curved surface that can be developed into a plane without expansion and contraction, and is a curved surface that can be formed by bending or cutting a plane.

The ability to be molded into a shape having a three-dimensional curved surface is also called "three-dimensional curved surface moldability".

The moth eye structure refers to a fine structure for suppressing the reflection of light. Particularly, in a case of having the purpose of suppressing reflection of visible light, the moth eye structure refers to a fine structure in which the distance between adjacent protrusions is less than 380 nm. It is preferable that the distance between adjacent protrusions is less than 190 nm, because light scattering is reduced and transparency is increased. Whether the moth eye structure is present can be checked by observing the surface shape with a scanning electron microscope (SEM)), an atomic force microscope (AFM) or the like, and checking whether the fine structure pattern can be formed.

Each component of the laminate according to the embodiment of the present invention is described with reference to FIG. 1.

An example of a laminate of the present invention is illustrated in FIG. 1. As illustrated in FIG. 1, a laminate 10 of FIG. 1 is a laminate in which a layer (a) 12 containing a film including a binder resin 14 and particles 13 is laminated on a substrate 11. The layer (a) 12 has an uneven shape formed of the particles 13 on the surface opposite to the substrate 11. As described above, after the laminate according to the embodiment of the present invention is molded in a shape of having a three-dimensional curved surface, it is preferable that the uneven shape is a moth eye structure, but in a state before molding, the uneven shape of the laminate may be a moth eye structure or may not be a moth eye structure.

In the uneven shape formed of the particle, it is preferable that the respective particles protruding from a film including the binder resin become protrusions, and portions in which the particle are not present become a recessed part.

In the uneven shape of the layer (a) of the laminate according to the embodiment of the present invention, B/A which is the ratio of a distance A between the peaks of the adjacent protrusions and a distance B between the center between the peaks of the adjacent protrusions and the recessed part is 0.35 or more. In a case where B/A is 0.35 or more, in a case where the laminate according to the embodiment of the present invention is molded in a shape of having a three-dimensional curved surface, and the antireflection layer is formed from the layer (a), the depth of the recessed part with respect to the distance between protrusions increases such that a refractive index gradient layer in which the refractive index changes gradually and continuously from the air to the inside of the antireflective layer can be formed, and thus the reflectivity can be reduced. B/A is preferably 0.40 or more and more preferably 0.45 or more.

B/A can be controlled by the volume ratio of the binder resin and the particles in the layer (a). Therefore, it is important to appropriately design the formulation ratio of the binder resin and the particle.

In the laminate according to the embodiment of the present invention, the distance A is preferably 200 nm to 400 nm, more preferably 220 nm to 300 nm, and even more preferably 240 nm to 280 nm.

The distance B is preferably 100 nm to 180 nm, more preferably 110 nm to 160 nm, and even more preferably 120 nm to 150 nm.

In the layer (a) of the laminate according to the embodiment of the present invention, the number of particles present on the surface opposite to the substrate is 6.3 to 20 per 1 $\mu m^2$. It is possible to cause the distance A to be a preferable numerical value range by causing the particle number of the particles to be in the above range, and thus in a case where the laminate according to the embodiment of the present invention is molded into a shape having a three-dimensional curved surface, a low reflectivity can be achieved. Specifically, in a case where the number of particles is 6.3 or more per 1 $\mu m^2$, the reflectivity in a case of being molded into a shape having a three-dimensional curved surface can be decreased, and in a case where the number of particles is 20 or less, the reflectivity unevenness in a case of being molded into a shape having a three-dimensional curved surface can be suppressed to be low.

In the layer (a) of the laminate according to the embodiment of the present invention, it is preferable that the number of particles present on the surface opposite to the substrate is 7 to 16 per 1 $\mu m^2$.

The heat shrinkage rate in a case where the laminate according to the embodiment of the present invention is heated at the glass transition temperature (Tg) of the substrate+10° C. for one hour is 20% or more and less than 70%.

In a case where the laminate has a heat shrinkage rate in the above range, it is possible to be molded into a shape having a three-dimensional curved surface by heating. The distance between particles is reduced by heat shrinkage of the laminate, in a case where the laminate according to the embodiment of the present invention is molded into a shape having a three-dimensional curved surface, the depth of the recessed part with respect to the distance of the protrusions becomes great, and thus satisfactory antireflection performance can be exhibited. Specifically, in a case where the heat shrinkage rate is caused to be 20% or more, followability to the curved surface becomes good, and thus satisfactory three-dimensional moldability can be obtained. In a case where the heat shrinkage rate is caused to be less than 70%, the residual strain after three-dimensional molding can be reduced, and thus it is possible to obtain the generation of the rainbow unevenness or the long-term stability of the shape.

The heat shrinkage rate of the laminate according to the embodiment of the present invention is preferably 40% or more and less than 60%.

The glass transition temperature (Tg) in the present invention is a boundary temperature at which the mobility of the polymer constituting the substrate of the laminate according to the embodiment of the present invention changes significantly. Tg in the present invention is a temperature in a case where 20 mg of the substrate is put into a closed type measurement pan of a differential scanning calorimeter (DSC) at 25° C. and the relative humidity of 10%, the temperature is raised from −100° C. to 230° C. by 10° C./min, and the baseline starts to deviate from the low temperature side.

The heat shrinkage in the present invention is irreversible shrinkage caused by the change in the arrangement of the polymer constituting the substrate by heating. The heat shrinkage rate in the present invention is obtained by the following method. That is, two reference lines are put on a sample piece cut into 120 mm×35 mm so as to have a distance of 100 mm, and the sample piece is left for one hour in a heating oven at Tg+10° C. under no tension. After this leaving, the sample piece is cooled to room temperature (25° C.), the distance between the two reference lines is measured, and the value is set as A (unit:mm). The numerical value calculated from the equation "100×(100−A)/100" by using the measured A is set as a heat shrinkage rate.

The laminate according to the embodiment of the present invention can be molded into a shape having a three-dimensional curved surface. Even in an antireflection film well-known in the related art in which antireflection layers having different refractive indexes are laminated on the substrate, a three-dimensional curved surface can be molded by heating by appropriately selecting the substrate type and the binder resin type, but it is difficult to maintain low reflectivity because, according to the change of the film thickness due to the heat shrinkage of the antireflection layer, the film deviates from the interference condition of light for exhibiting the antireflection function. It is thought that the heat shrinkage rate is likely to be uneven between the end portion and the central portion of the film, and the reflection unevenness after the heat shrinkage is likely to occur.

Meanwhile, in the present invention, in a case of the film has a predetermined uneven shape and a heat shrinkage rate, it is possible to form a moth eye structure effective for exhibiting antireflection performance after heat shrinkage of the laminate, such that, even after the film is molded into a shape having a three-dimensional curved surface, the reflectivity is low, and reflectivity unevenness can be suppressed.

Hereinafter, each component constituting the laminate according to the embodiment of the present invention is more specifically described.

<<Substrate>>

It is preferable that the heat shrinkage rate in a case where the substrate of the laminate according to the embodiment of the present invention is heated at the glass transition temperature of the substrate+10° C. for one hour is 20% or more and less than 70%.

As the substrate, a plastic film formed of a resin (polymer) having transparency and flexibility is preferably used. Preferable examples of the plastic film for the substrate include a film formed of a polyester film such as polyethylene terephthalate, polyethylene naphthalate, polyethylene isophthalate, and polybutylene terephthalate, a (meth)acrylic resin, a polystyrene resin, a polyolefin-based resin, a cyclic polyolefin-based resin, and a cellulose-based resin such as cellulose acylate. Here, the (meth)acrylic resin includes a polymer having a lactone ring structure, a polymer having a glutaric anhydride ring structure, and a polymer having a glutarimide ring structure. Other plastic films can be used as long as the plastic films have required strength and optical suitability.

The substrate is preferably an amorphous plastic film. It is preferable that the amorphous plastic film is stretched, and a biaxially stretched film is more preferable for the moldability of the three-dimensional curved surface. Biaxial stretching may be either sequential stretching or simultaneous longitudinal and transverse stretching. Stretching is performed by heating to a temperature above the glass transition temperature of the plastic material constituting the substrate. The stretching ratio is preferably 1.2 to 3.3 times. The stretching ratio may be different between longitudinal and transverse.

The substrate may or may not have ultraviolet permeability, but it is preferable that a substrate does not have ultraviolet permeability. In a case where the substrate does not have ultraviolet permeability, the deterioration in a case of being exposed to sunlight can be reduced.

The film thickness of the substrate is not particularly limited, but is preferably 10 μm to 200 μm and more preferably 10 μm to 50 μm.

<<Layer (a)>>

The layer (a) contains a binder resin and particles.

(Binder Resin)

The binder resin preferably has a function of binding particles to a substrate or a laminate of a substrate and another layer.

It is preferable that the binder resin includes a cured product of the curable compound.

The binder resin can be obtained by curing a curable compound.

A curable compound used in the forming of the binder resin is referred to as a curable compound (a1).

<Curable Compound (a1)>

The curable compound (a1) is preferably a compound (preferably an ionizing radiation curable compound) having a polymerizable functional group. As the compound having a polymerizable functional group, various monomer oligomers, and polymers can be used. As the polymerizable functional group (polymerizable group), photopolymerizable, electron beam polymerizable, or radiation polymerizable groups are preferable. Among the groups, a photopolymerizable functional group is preferable.

Examples of the photopolymerizable functional group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Specific examples of the compound having a polymerizable unsaturated group include (meth)acrylic acid diesters of alkylene glycol such as neopentyl glycol acrylate, 1,6-hexanediol (meth)acrylate, and propylene glycol di(meth)acrylate:

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate:

(meth)acrylic acid diesters of polyhydric alcohol such as pentaerythritol di(meth)acrylate and (meth)acrylic acid diesters of an ethylene oxide or propylene oxide adduct such as 2,2-bis{4-(acryloxy.diethoxy)phenyl}propane, and 2-2-bis{4-(acryloxy.polypropoxy)phenyl}propane.

Epoxy (meth)acrylates, urethane (meth)acrylates, and polyester (meth)acrylates are also preferably used as a compound having a photopolymerizable functional group.

Among these, esters of polyhydric alcohol and (meth)acrylic acid are preferable. More preferably, it contains at least one polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, caprolactone-modified dipentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

Specific compounds of polyfunctional acrylate-based compounds having (meth)acryloyl groups include esterified products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd., and V #3PA, V #400, V #36095D, V #1000, and V #1080 manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by Nippon Synthetic Chem Industry Co., Ltd.). UA-306 H, UA-306 I, UA-306 T, and UL-503 LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K. EB-220, EB-5129, EB-1830, and EB-4858 (manufactured by Daicel-UCB Corporation), A-TMMT, A-TMPT, U-4HA. U-6HA, U-10HA, and U-15HA (manufactured by Shin Nakamura Chemical Co., Ltd.), HIGH-COAP AU-2010 and HIGH-COAP AU-2020 (manufactured by Tokushiki Co., Ltd.), ARONIX M-1960 (manufactured by Toagosei Co., Ltd.), ARTRESIN UN-3320HA, UN-3320HC, UN-3320HS, UN-904, and HDP-4T, trifunctional or higher functional polyester compounds such as ARONIX M-8100, M-8030, and M-9050 (manufactured by Toagosei Co., Ltd.), and KRM-8307 (manufactured by Daicel-Allnex Ltd.), and the like can be suitably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

Compounds disclosed in JP2005-76005A and JP2005-36105A, dendrimers such as SIRIUS-501 and SUBARU-501 (manufactured by Osaka Organic Chemical Industry Ltd.), and norbornene ring-containing monomers disclosed in JP2005-60425A can be used.

In order to obtain a strong film by pasting the particle and the curable compound (a1) to each other, a silane coupling agent having a polymerizable functional group may be used as the curable compound (a1).

Specific examples of a silane coupling agent having a polymerizable functional group include 3-(meth)acryloxypropyltrimethoxysilane, 3-(meth)acryloxvpropylmethymethldimethoxysilane, 3-(meth)acryloxypropyldimethylmethoxvsilane, 3-(meth)acryloxypropylmethyldiethoxysilane, 3-(meth)acryloxypropyl triethoxysilane, 2-(meth)acryloxyethyltrimethoxysilane, 2-(meth)acryloxyethyltriethoxysilane, 4-(meth)acryloxybutyltrimethoxysilane, and 4-(meth)acryloxybutyltriethoxysilane. Specific examples thereof include KBM-503 and KBM-5103 (manufactured by Shin-Etsu Chemical Co., Ltd.), silane coupling agents X-12-1048, X-12-1049, and X-12-1050 (manufactured by Shin-Etsu Chemical Co., Ltd.) disclosed in JP2014-123091A, and a compound C3 represented by the following structural formula.

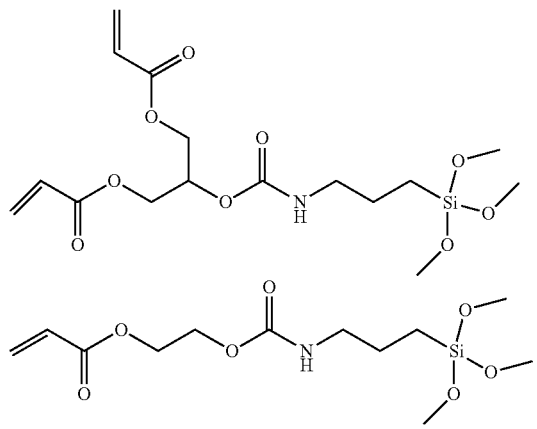

C3

Two or more types of the compounds having a polymerizable functional group may be used in combination. The polymerization of these compounds having a polymerizable functional group can be performed by irradiation with ionizing radiation or heating under the presence of a photoradical initiator or a thermal radical initiator.

The layer (a) can further include a compound in addition to the curable compound (a1).

In the present invention, in view of easy permeation into a pressure sensitive adhesive layer described below, as the curable compound (a1), a compound having a two or less polymerizable functional groups in one molecule may be used, but, particularly, it is preferable that a compound having three or more polymerizable functional groups in one molecule and a compound having two or less polymerizable functional groups in one molecule or a compound not having a polymerizable functional group as a compound other than the curable compound (a1) may be used in combination. The compound not having a polymerizable functional group may be a binder compound.

The compound having two or less polymerizable functional groups in one molecule or a compound not having a polymerizable functional group is preferably a compound in which a weight-average molecular weight (Mwa) is $40<Mwa<500$ and an SP value (Spa) by the Hoy method is $19<SPa<24.5$, since the compound is easily permeated to the pressure sensitive adhesive layer.

The compound having two or less polymerizable functional groups in one molecule is preferably a compound having one polymerizable functional group in one molecule.

The SP value (solubility parameter) in the present invention is a value calculated by the Hoy method, and the Hoy method is disclosed in POLYMER HANDBOOK FOURTH EDITION.

The viscosity of the compound having two or less polymerizable functional groups in one molecule or the compound not having a polymerizable functional group at 25° C. is preferably 100 mPas or less, more preferably 1 to 50 mPas, and even more preferably 1 to 20 mPas. The compound in this viscosity range is preferable since the compound easily permeate pressure sensitive adhesive layer and also works so as to suppress aggregation of the particle (a2) such that haze and muddiness can be suppressed. Particularly, the aggregation of the particle (a2) can be suppressed by curing a portion of the curable compound (a1) before a pressure sensitive adhesive layer is laminated as described below, but it is preferable to use a compound in the viscosity range, since even in a case where curing is progressed, a compound having two or less polymerizable functional groups in one molecule or a compound not having a polymerizable functional group can be caused to be sufficiently permeated to the pressure sensitive adhesive layer. Particularly, it is preferable that the compound is in the viscosity range of 1 to 20 mPas, since an effect of the increase of the reflectivity or the decrease of the total light transmittance which is obtained by clogging a gap of the particle with the binder is great.

The compound having two or less polymerizable functional groups in one molecule preferably has a (meth) acryloyl group, an epoxy group, an alkoxy group, a vinyl group, a styryl group, and an allyl group as the polymerizable functional group.

As the compound not having a polymerizable functional group, an ester-based compound, an amine-based compound, an ether-based compound, an aliphatic alcohol-based compound, a hydrocarbon-based compound, and the like can be preferably used, and an ester-based compound is particularly preferable. More specific examples thereof include dimethyl succinate (SP value: 20.2, viscosity 2.6 mPas), diethyl succinate (SP value: 19.7, viscosity 2.6 mPas), dimethyl adipate (SP value: 19.7, viscosity 2.8 mPas), dibutyl succinate (SP value: 19.1, viscosity: 3.9 mPas), bis(2-butoxyethyl) adipate (SP value: 19.0, viscosity 10.8 mPas), dimethyl suberate (SP value: 19.4, viscosity: 3.7 mPas), diethyl phthalate (SP value: 22.3, viscosity: 9.8 mPas), dibutyl phthalate (SP value: 21.4, viscosity 13.7 mPas), triethyl citrate (SP value: 22.5, viscosity 22.6 mPas), acetyl triethyl citrate (SP value: 21.1, viscosity 29.7 mPas), and diphenyl ether (SP value: 21.4, viscosity 3.8 mPas).

The content of the binder resin included in the layer is preferably 100 mg/m$^2$ to 800 mg/m$^2$, more preferably 100 mg/m$^2$ to 600 mg/m$^2$, and even more preferably 100 mg/m$^2$ to 400 mg/m$^2$.

As described above, the laminate according to the embodiment of the present invention has a thermal shrinkage of 20% or more and less than 70% in a case of being heated at a glass transition temperature of the substrate of +10° C. for one hour, and in view of satisfying the requirements, it is preferable that the binder resin has a growth rate of 10% or more. Examples of the binder resin include a polymer having a spacer or a polymer having a rubber-like structure, and may include either or both of the above. As the above polymer, poly(meth) acrylate or polyurethane (meth) acrylate is preferable. The molecular weights of the binder resin and the polymer are not particularly limited as long as the binder resin and the polymer exhibit the above effects of the present invention, and an oligomer may be used.

Here, with respect to the growth rate in the present specification, the sample is cut such that the length in the measurement direction becomes 100 mm, and the width is 10 mm, and immediately after the antireflection film is left for two hours in an environment of 25° C. and the relative humidity of 60%, an elongation at break in a case where the sample is stretched at interlock length of 100 mm and an elongation at break in a tension rate of 10%/min in an atmosphere of 25° C. and the relative humidity of 60% is measured by using a fully automatic tensile tester manufactured by INTESCO Co. Ltd. to obtain a growth rate (%).

The growth rate of the binder is a value obtained by preparing the coating film having a thickness of 10 μm on glass and performing the above measurement on a sample of only the binder obtained by peeling from the glass.

A polymer having a spacer is a polymer having a spacer in a molecule. The spacer is a group that two-dimensionally or three-dimensionally connects molecules by a covalent bond, and an alkylene group having 2 to 12 carbon atoms, an alkylene oxide group having 2 to 12 carbon atoms, or the like is preferable.

The polymer having a rubber-like structure is a polymer having a polymerizable group in the molecule. Such a polymer is cured so that the polymerizable group crosslinks between molecules, and the cured product has rubber elastic properties. For example, the polymerizable group is preferably an unsaturated polymerizable group and more preferably a vinyl group.

The binder resin can be obtained by polymerizing a binder resin forming compound. The binder resin forming compound is a compound having a polymerizable group (curable compound), and is preferably a monomer or an oligomer.

A polymer having a spacer can be obtained by polymerizing a binder resin forming compound having a spacer.

A polymer having a rubber-like structure can be obtained by adjusting the reaction rate of the binder resin forming compound having a polymerizable group, or can be obtained by introducing a polymerizable group after the binder resin forming compound is polymerized.

As the binder resin and the binder resin forming compound, a commercially available product can be used.

A commercially available product of (meth)acrylate having a spacer or rubbery structure is preferably BAC-45 (polybutadiene terminal diacrylate, a growth rate of 100%, manufactured by Osaka Organic Chemical Industry Ltd.), and HYDRAN UV-100A (growth rate of 45%, manufactured by DIC Corporation).

Examples of a commercial product of polyurethane (meth)acrylate include UA-122P (urethane acrylate oligomer, elongation at break of 30%, manufactured by Shin-Nakamura Chemical Co., Ltd.), UV2750B (urethane acrylate oligomer, elongation at break of 40%, manufactured by The Nippon Synthetic Chemical Co., Ltd.), UV-6630B (urethane acrylate oligomer, elongation at break of 12%, manufactured by The Nippon Synthetic Chemical Co., Ltd.), and UV-7510 B (urethane acrylate oligomer, elongation at break of 20%, manufactured by The Nippon Synthetic Chemical Co., Ltd.).

<Particle>

As the particles, both of inorganic particles and resin particles can be used, but in view of improving the scratch resistance, inorganic particles are preferable, and metal oxide particles are particularly preferable.

<Metal Oxide Particle>

Examples of the metal oxide particle include a silica particle, a titania particle, a zirconia particle, and an antimony pentoxide particle. Since the refractive index is close to many binder resins, haze is hardly generated and the moth eye structure is easily formed. Therefore, a silica particle is preferable. The silica particle may be crystalline or amorphous. A shape of the metal oxide particle is most preferably a spherical shape, but may be a shape other than a spherical shape such as an amorphous shape. Only one kind of the metal oxide particle may be used, or two or more kinds of particles having different average primary particle diameter may be used.

In view of high hardness, the metal oxide particles are particularly preferably calcined silica particles.

The calcined silica particle can be manufactured by a well-known technique of hydrolyzing and condensing a hydrolyzable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane; an alkoxy silane compound such as tetramethoxy silane, tetraethoxy silane, tetraisopropoxy silane, tetrabutoxy silane, methyltrimethoxy silane, methyltriethoxy silane, trimethoxyvinyl silane, triethoxyvinyl silane, 3-glycidoxypropyltrimethoxy silane, 3-chloropropyltrimethoxy silane, 3-mercaptopropyltrimethoxy silane, 3-(2-aminoethylamino) propyltrimethoxy silane, phenyltrimethoxy silane, phenyltriethoxy silane, dimethyl dimethoxy silane, dimethyl diethoxy silane, 3-glycidoxypropylmethyldimethoxy silane, 3-glycidoxypropylmethyldiethoxy silane, 3-chloropropylmethyldimethoxy silane, diphenyldimethoxy silane, diphenyldiethoxy silane, dimethoxydiethoxy silane, trimethylmethoxy silane, and trimethylethoxy silane; an acyloxy silane compound such as tetraacetoxy silane, methyl triacetoxy silane, phenyl triacetoxy silane, dimethyl diacetoxy silane, diphenyl diacetoxy silane, and trimethylacetoxy silane; and a silanol compound such as dimethyl silanediol, diphenyl silanediol, and trimethylsilanol. Among the exemplary silane compounds, an alkoxysilane compound is particularly preferable, since alkoxysilane compound can be obtained more easily and halogen atoms as impurities in the obtained calcined silica particle are not included. As a preferred embodiment of the calcined silica particle according to the present invention, it is preferable that the content of halogen atoms is substantially 0%, and halogen atoms are not detected.

The calcining temperature is not particularly limited, but is preferably 800° C. to 1.300° C. and more preferably 1,000° C. to 1,200° C.

As the metal oxide particle, a surface-treated inorganic fine particle is preferably used for improving the dispersibility in the coating liquid, improving the film hardness, and preventing aggregation. Specific examples and preferable examples of the surface treatment method are in the same manner as those described in <0119> to <0147> of JP2007-298974A.

Particularly, in view of binding performance to the curable compound (a1) for forming the binder resin and improving the strength of the antireflection layer, it is preferable that the particle surface is surface-modified with a compound having a polymerizable unsaturated group (preferably an unsaturated double bond) and a functional group having reactivity with the particle surface, and the polymerizable unsaturated group (preferably an unsaturated double bond) is provided to the particle surface. As the compound used in the surface modification, a silane coupling agent having a polymerizable functional group described above as the curable compound (a1) can be appropriately used.

Specifically, it is preferable to modify metal oxide particle surfaces with commercially available KBM-503 and KBM-5103 (all manufactured by Shin-Etsu Chemical Co., Ltd.), and (meth)acryloyl group-containing silane coupling agents such as X-12-1048, X-12-1049, and X-12-1050 disclosed in JP2014-123091A.

(Hardness)

Since the surfaces of the laminate and the antireflection product having a three-dimensional curved surface according to the embodiment of the present invention have more excellent scratch resistance, the indentation hardness of the particles is preferably 400 MPa or more, more preferably 450 MPa or more, and even more preferably 550 MPa or more. It is preferable that the indentation hardness of the particle is 400 MPa or more, since the durability against the pressure in the thickness direction of the moth eye structure increases. In order to prevent brittleness and easy cracking, the indentation hardness of the particle is preferably 1,000 MPa or less.

The indentation hardness of the particle can be measured by a nanoindenter or the like. As a specific measurement method, the particles are aligned on a substrate (glass plate, quartz plate, or the like) which is harder than the fine particles such that the particles are not overlapped by one or more stages and are pushed with a diamond indenter for measurement. In this case, it is preferable to fix the particles with a resin or the like such that the particles do not move. However, in the case of fixing with the resin, adjustment is performed such that a part of the particles is exposed. Further, it is preferable that the pushing position is specified by the tribbindenter.

Also in the present invention, particles are arranged on the substrate, a sample is manufactured by binding and fixing the particles by using a minute amount of a curable resin so as not to affect the measurement value, and the indentation hardness of the particle of the sample is measured by a method using an indenter.

(Average Primary Particle Diameter)

The average primary particle diameter of the particle is preferably 250 nm or less, preferably 100 nm to 190 nm, more preferably 120 nm to 180 nm, and even more preferably 140 nm to 170 nm.

Here, the average primary particle diameter of the particles refers to the cumulative 50% particle diameter of the volume-average particle diameter. A scanning electron microscope (SEM) can be used to measure the particle diameter. A powder particle (in a case of a dispersion, ones obtained by volatilizing a solvent by drying) is observed at the appropriate magnification (about 5000 times) by scanning electron microscope (SEM) observe, the diameter of each of 100 primary particles is measured, the volume thereof is calculated, and the cumulative 50% particle diameter can be taken as the average primary particle diameter. In a case where the particle is not spherical, the average value of the long diameter and the short diameter is regarded as the diameter of the primary particle. In a case where the particles contained in the laminate are measured, it is calculated by observing the laminate from the front surface side by SEM in the same manner as described above. In this case, for easier observation, carbon vapor deposition, an etching treatment, and the like may be suitably applied to the sample.

<<Hard Coat Layer>>

The laminate according to the embodiment of the present invention may have a hard coat layer between the substrate and the layer (a). The hard coat layer is preferably formed by a polymerization reaction of a curable compound (preferably an ionizing radiation curable compound) which is a compound having a polymerizable group. The cured compound may be a monomer or an oligomer. The curable compound preferably has two or more polymerizable groups in a molecule.

As the polymerizable group, light, electron beam, or radiation polymerizable group is preferable, and among them, a photopolymerizable group is preferable.

Examples of the photopolymerizable group include unsaturated polymerizable groups such as a (meth)acryloyl group, a vinyl group, a styryl group, and an allyl group. Among them, a (meth)acryloyl group is preferable.

It is preferable that the growth rate of the hard coat layer is 10% or more. Specifically, a compound which is the same as the curable compound or the binder can be used. As the result, the moldability of the hard coat layer into a shape having a three-dimensional curved surface can be improved. The growth rate of the hard coat layer is preferably 20% or more, more preferably 40% or more, and particularly preferably 100% or more. In order to cause the growth rate of the hard coat layer to be 10% or more, the cured product of the above curable compound is preferably a polymer having a spacer or a polymer having a rubber-like structure described as the preferable embodiment in the binder resin of the laminate. Since, in a case of having a polymer having a spacer or a polymer having a rubber-like structure, the hard coat layer can follow the shrinkage of the substrate in a case where a three-dimensional curved surface is molded, the optical performance is not deteriorated, and defects such as cracking are not generated.

The growth rate of the hard coat layer is a value obtained by performing the same measurement as the measurement of the growth rate of the laminate with respect to a sample obtained by forming a coating film having a thickness of 10 µm on glass and peeling the coating film from the glass.

In view of providing sufficient three-dimensionally curved surface moldability to the laminate, the thickness of the hard coat layer is preferably 10 µm or less and more preferably 5 µm or less.

The strength of the hard coat layer is preferably H or more and more preferably 2H or more in a pencil hardness test.

The laminate according to the embodiment of the present invention is molded into a shape having a three-dimensional curved surface, and disposed on the surface of the product having a three-dimensional curved surface, so as to provide an antireflection performance to the product having a three-dimensional curved surface. That is, the laminate according to the embodiment of the present invention is molded into a shape having a three-dimensional curved surface and functions as an antireflection laminate having a three-dimensional curved surface.

[Method of Manufacturing Laminate]

The method of manufacturing the laminate according to the embodiment of the present invention is not particularly limited, but examples of the aspect of the preferable manufacturing method include a manufacturing method including first to fifth steps as described below. FIG. 2 is a schematic cross-sectional view of a method of manufacturing a laminate according to an embodiment of the present invention.

The laminate according to the embodiment of the present invention preferably includes a first step of coating the substrate 11 with a curable composition including a curable compound and the particles 13 to provide a first layer 15 including a curable compound in a thickness in which the fine particle 13 is buried in the first layer 15 as illustrated in FIG. 2(1), a second step of pasting a pressure sensitive adhesive layer 32 of a pressure sensitive film 33 having a support 31 and the pressure sensitive adhesive layer 32 provided on the support 31 to a surface (interface) 16 of the first layer 15 on an opposite side of the substrate 11 as illustrated in FIG. 2(2), a third step of burying the particle 13 in a layer 17 obtained by combining the first layer 15 and the pressure sensitive adhesive layer 32 and causing a position of the interface 16 to come close to the substrate 11 side such that the particle 13 protrudes from the interface 16 between the first layer 15 and the pressure sensitive adhesive layer 32 as illustrated in FIG. 2(3), a fourth step of curing the first layer 15 in a state in which the particle 13 is buried in the layer 17 obtained by combining the first layer 15 and the pressure sensitive adhesive layer 32 as illustrated in FIG. 2(4), and a fifth step of peeling off the pressure sensitive film 33 as illustrated in FIG. 2(5), in this order.

In the manufacturing method, the pressure sensitive film and the first layer are pasted to each other in the second step, the particles 13 are buried in the layer 17 obtained by combining the first layer 15 and the pressure sensitive adhesive layer 32 in the third step, so as to protrude from the interface opposite of the first layer 15 to the substrate 11 side, the first layer is cured in a state in which the particles 13 are buried in the layer 17 obtained by combining the first layer 15 and the pressure sensitive adhesive layer 32 to each other in the fourth step, and the aggregation is suppressed by causing the particle 13 not to expose to the air interface before curing the first layer 15, such that a satisfactory uneven shape formed of the particles can be manufactured.

<<First Step>>

The first step is a step of providing a curable compound and particles on the substrate, in a thickness in which the particles are buried in the first layer including the curable compound.

According to the present invention, a "thickness in which the particles are buried in the layer including the curable compound" refers to a thickness of 0.8 times or more of the average primary particle diameter of the particles.

The description of the substrate is not provided since the substrate is the same as the above substrate of the laminate, but it is preferable to cause the un-stretched substrate to be stretched so as to cause the substrate to have heat shrinking properties.

In the first step, the method of providing the first layer to the substrate is not particularly limited, but it is preferable that the first layer is provided by coating the substrate with the composition for forming the first layer. In this case, the first layer is a layer obtained by applying a composition including the curable compound and the particles. The coating method is not particularly limited, and well-known methods can be used. Examples thereof include a dip coating method, an air knife coating method, a curtain coating method, a roller coating method, a wire bar coating method, a gravure coating method, and a die coating method.

In the first step, it is preferable that a plurality of particles are not present in a direction orthogonal to the surface of the substrate. Here, the expression "the plurality of particle are not present in the direction orthogonal to the surface of the substrate" indicates that, in a case where 10 µm×10 µm of the in-plane of the substrate is observed with three visual fields with a scanning electron microscope (SEM), the proportion of the number of particles in a state in which a plurality of the particles are not present in the direction orthogonal to the surface is 80% or more and preferably 95% or more.

<Composition for Forming First Layer>

The first layer is preferably formed by applying a curable composition (composition for forming the first layer) including a curable compound and particles. The composition for forming the first layer may contain a component in addition to the curable compound and the particles, and examples thereof include a solvent, a polymerization initiator, a dispersing agent of the particle, a leveling agent, and an antifouling agent.

The curable compound is the same as the binder resin forming compound for forming the binder resin included in the layer (a) of the laminate described above, and thus the description thereof is not provided.

The particles are the same as the particles included in the layer (a) of the laminate described above, and thus the description thereof is not provided.

<Solvent>

In view of improving the dispersibility, it is preferable to select a solvent having a polarity close to that of the particles. Specifically, for example, in a case where the particles are metal oxide particles, an alcohol-based solvent is preferable, and examples thereof include methanol, ethanol, 2-propanol, 1-propanol, and butanol. For example, in a case where the particles are metal resin particles subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

—Dispersing Agent of Particles—

In the present invention, a dispersing agent of the particles may be used.

The dispersing agent of the particle lowers the cohesive force between the particles such that the particles can be easily arranged in a uniform manner. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product can be used.

—Leveling Agent—

The leveling agent lowers the surface tension of the first layer, such that the liquid after coating is stabilized and the curable compound and the particles can be easily arranged in a uniform manner.

A composition for forming the first layer used in the present invention can contain at least one leveling agent.

Accordingly, it is possible to suppress film thickness unevenness and the like caused by drying unevenness due to local distribution of drying air, to improve cissing of a coated product, or to easily arrange the curable compound and the particles in a uniform manner.

As the leveling agent, specifically, at least one leveling agent selected from a silicone-based leveling agent and a fluorine-based leveling agent can be used. The leveling agent is preferably an oligomer or a polymer rather than a low molecular compound.

In a case where a leveling agent is added, a leveling agent rapidly moves to the surface of the applied coating film and is unevenly distributed, and thus the leveling agent is unevenly distributed on the surface as it is even after the coating film is dried. Therefore, the surface energy of the film to which the leveling agent is added decreases. In view of preventing film thickness unevenness, cissing, and unevenness, it is preferable that the surface energy of the film is low.

Preferable examples of the silicone-based leveling agent include a polymer or an oligomer including a plurality of dimethylsilyloxy units as repeating units and having substituents at a terminal and/or a side chain. A polymer or an oligomer including dimethylsilyloxy as repeating units may include a structural unit in addition to dimethylsilyloxy. The substituent may be identical to or different from each other and it is preferable to include a plurality of substituents. Examples of preferred substituents include groups including a polyether group, an alkyl group, an aryl group, an aryloxy group, an aryl group, a cinnamoyl group, an oxetanyl group, a fluoroalkyl group, a polyoxyalkylene group, or the like.

The number-average molecular weight of the silicone-based leveling agent is not particularly limited, and the number-average molecular weight is preferably 100,000 or less, more preferably 50,000 or less, even more preferably 1,000 to 30,000, and particularly preferably 1,000 to 20,000.

The content of the leveling agent is preferably 0.01 to 5.0 mass %, more preferably 0.01 to 2.0 mass %, and most preferably 0.01 to 1.0 mass % with respect to the total solid content of the composition for forming the first layer.

The fluorine-based leveling agent is a compound of a fluoroaliphatic group and an amphipathic group that contributes to affinity for various compositions for coating or molding materials, and the like in a case where this leveling agent is used as an additive in the same molecule, and this compound can generally be obtained by copolymerizing a monomer having a fluoroaliphatic group and a monomer having an amphiphathic group.

Representative examples of the monomer having an amphiphathic group copolymerized with a monomer having a fluoroaliphatic group include poly(oxyalkylene) acrylate and poly(oxyalkylene) methacrylate.

As the fluorine-based leveling agent, compounds disclosed in JP2004-331812A and JP2004-163610A or the like can be used.

(Antifouling Agent)

For the purpose of providing characteristics such as antifouling properties, water resistance, chemical resistance, and sliding properties, well-known silicone-based or fluorine-based antifouling agent, lubricant, or the like can be suitably added to the first layer.

As the specific examples of the silicone-based or fluorine-based antifouling agent, leveling agents having an ionizing radiation curing group among the silicone-based or fluorine-based leveling agents described above can be suitably used, but the present invention is not limited thereto.

The content of the antifouling agent is preferably 0.01 to 5.0 mass %, more preferably 0.01 to 2.0 mass %, and most preferably 0.01 to 1.0 mass % with respect to the total solid content thereof in the first layer.

(Polymerization Initiator)

The polymerization initiator is preferably a photopolymerization initiator.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable aspects, commercially available products and the like of the photopolymerization initiator are disclosed in paragraphs <0133> to <0151> of JP2009-098658A and can be suitably used in the present invention in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful in the present invention.

The content of the polymerization initiator in the first layer is an amount sufficient for polymerizing the polymerizable compound included in the first layer and is preferably 0.1 to 8 mass % and more preferably 0.5 to 5 mass % with respect to the total solid content in the first layer such that the starting point does not excessively increase.

For the reaction of the silane coupling agent having a polymerizable functional group described above, a compound that generates an acid or a base by light or heat (hereinafter, sometimes referred to as a photoacid generator, a photobase generator, a thermal acid generator, or a thermal base generator) may be included in the first layer.

(Photoacid Generator)

Examples of the photoacid generator include onium salt such as diazonium salt, ammonium salt, phosphonium salt, iodonium salt, sulfonium salt, selenonium salt, and an arsonium salt, an organohalogen compound, organometallic/organic halide, a photoacid generator having an o-nitrobenzyl-based protecting group, a compound that is photolyzed to generate sulfonic acid and is represented by iminosulfonate and the like, a disulfone compound, diazoketosulfone, and a diazodisulfone compound. Examples thereof also include triazines (for example, 2-(4-methoxyphenyl)-4,6-bis(trichloromethyl)-1,3,5-triazine, and the like), quaternary ammonium salts, a diazomethane compound, an imide sulfonate compound, and an oxime sulfonate compound.

A group that generates an acid by light or a compound obtained by introducing a compound into a main chain or a side chain of a polymer can be used.

Compounds that generate acid by light which are disclosed in V. N. R. Pillai, Synthesis. (1), 1 (1980), A. Abad et al., Tetrahedron Lett., (47) 4555 (1971), D. H. R. Barton et al., J. Chem. Soc., (C), 329 (1970), U.S. Pat. No. 3,779,778A, and EP126,712B can be used.

(Thermal Acid Generator)

Examples of the thermal acid generator include salt including an acid and an organic base.

Examples of the acid described above include organic acid such as sulfonic acid, phosphonic acid, and carboxylic acid and inorganic acid such as sulfuric acid and phosphoric acid. In view of compatibility with the curable compound, organic acid is more preferable, sulfonic acid and phosphonic acid are more preferable, and sulfonic acid is most preferable. Preferable examples of sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS).

As specific examples of the acid generator, acid generators disclosed in JP2016-000803A can be suitably used.

(Photobase Generator)

Examples of the photobase generator include a substance that generates bases by the action of active energy rays. More specifically, (1) a salt of organic acid and a base which is decomposed by decarboxylation by irradiation with ultraviolet rays, visible light, or infrared rays, (2) a compound decomposed by intramolecular nucleophilic substitution reaction or transition reaction to emit amines, or (3) a substance which causes some chemical reaction by irradiation with ultraviolet rays, visible light, or infrared rays to emit a base can be used.

The photobase generator used in the present invention is not particularly limited, as long as the photobase generator is a substance that generates a base by the action of active energy rays such as ultraviolet rays, electron beams, X-rays, infrared rays, and visible light.

Specifically, photobase generators disclosed in JP2010-243773A can be suitably used.

The content of the compound that generates an acid or a base by light or heat in the first layer is an amount sufficient for polymerizing the polymerizable compound included in the first layer and is preferably 0.1 to 8 mass % and more preferably 0.1 to 5 mass % with respect to the total solid content in the first layer such that the starting point does not excessively increase.

<<Second Step>>

The second step is a step of pasting the pressure sensitive film 33 having the pressure sensitive adhesive layer 32 on the support 31 to the first layer 15.

The method of pasting the first layer 15 and the pressure sensitive film 33 is not particularly limited, and well-known methods may be used. Examples thereof include a lamination method.

The pressure sensitive film 33 is pasted such that the first layer 15 and the pressure sensitive adhesive layer 32 are in contact with each other.

Before the second step, a step of drying the first layer may be provided. The drying temperature of the first layer 15 is preferably 20° C. to 60° C. and more preferably 20° C. to 40° C. The drying time is preferably 0.1 to 120 seconds and more preferably 1 to 30 seconds.

<Pressure Sensitive Film>

The pressure sensitive film 33 has a support and a pressure sensitive adhesive layer.

<Support>

The support 31 in the pressure sensitive film 33 is described below.

As the support 31, a plastic film formed of a resin having transparency and flexibility is preferably used. Preferable examples of the plastic film for the support include a film formed of a polyester film such as polyethylene terephthalate, polyethylene naphthalate, polyethylene isophthalate, and polybutlene terephthalate, a (meth)acrylic resin, a polycarbonate-based resin, a polystyrene-based resin, a polyolefin-based resin, a cyclic polyolefin-based resin, and a cellulose-based resin such as cellulose acylate. Here, the (meth)acrylic resin preferably includes a polymer having a lactone ring structure, a polymer having a glutaric anhydride ring structure, and a polymer having a glutarimide ring structure.

Other plastic films can be used as long as the plastic films have required strength and optical suitability. The support may be an un-stretched film or may be uniaxially or biaxially stretched. Otherwise, the support may be a plastic film in which an angle of the axis method formed according to the stretching ratio and stretching crystallization is controlled.

As the support 31, those having ultraviolet permeability are preferable. It is preferable to have ultraviolet permeability in view of manufacturing suitability, since in the fourth step, ultraviolet irradiation from the support 31 side can be performed in a case of curing the first layer 15.

Specifically, the maximum transmittance of the support 31 at the wavelength of 250 nm to 300 nm is preferably 20% or more, more preferably 40% or more, and most preferably 60% or more. It is preferable that the maximum transmittance at the wavelength of 250 nm to 300 nm is 20% or more, since the first layer can be easily cured by being irradiated with ultraviolet rays from the support 31 side.

Specifically, the maximum transmittance of the pressure sensitive film 33 in which the sensitive adhesive layer 32 is formed on the support 31 having support at the wavelength of 250 nm to 300 nm is preferably 20% or more, more preferably 40% or more, and most preferably 60% or more.

The film thickness of the support 31 is not particularly limited, but is preferably 10 μm to 100 μm, more preferably 10 μm to 50 μm, and even more preferably 10 μm to 40 μm.

(Pressure Sensitive Adhesive Layer)

It is preferable that the pressure sensitive adhesive layer 32 is formed of a pressure sensitive adhesive having a gel fraction of 95.0% or more.

In a case where the gel fraction of the pressure sensitive adhesive is 95.0% or more, in a case where the laminate according to the embodiment of the present invention is manufactured by peeling off the pressure sensitive film in the fifth step, the pressure sensitive adhesive component hardly remains on the surface of the laminate, and washing is not required.

The gel fraction of the pressure sensitive adhesive is preferably in the range of 95.0% to 99.9%, more preferably in the range of 97.0% to 99.9%, and even more preferably in the range of 98.09/to 99.9%.

The gel fraction of the pressure sensitive adhesive is a proportion of an insoluble matter after the pressure sensitive adhesive is immersed in tetrahydrofuran (THF) at 25° C. for 12 hours and is obtained from the following expression.

Gel fraction=(mass of insoluble matter of pressure sensitive adhesive in THF)/(total mass of pressure sensitive adhesive)×100(%)

The weight-average molecular weight of the sol component in the pressure sensitive adhesive is preferably 10,000 or less, more preferably 7,000 or less, and most preferably 5,000 or less. By setting the weight-average molecular weight of the sol component within the above range, the component of the pressure sensitive adhesive can be caused to hardly remain on the surface of the laminate in a case where the pressure sensitive film is peeled off to manufacture the laminate according to the embodiment of the present invention.

The sol component of the pressure sensitive adhesive represents a dissolution amount in THF after the pressure sensitive adhesive is immersed in tetrahydrofuran (THF) at 25° C. for 12 hours. The weight-average molecular weight can be analyzed by gel permeation chromatography (GPC).

The film thickness of the pressure sensitive adhesive layer 32 is preferably 0.1 µm to 50 µm more preferably 1 min to 30 µm, and even more preferably 1 µm to 20 µm.

The pressure sensitive adhesive layer 32 is preferably a pressure sensitive adhesive layer having a slight pressure sensitive adhesive strength in which a peeling strength (pressure sensitive adhesive strength) to a surface of an adherend at a peeling rate of 0.3 m/min is about 0.03 to 0.3 N/25 mm, since operability in a case of peeling off the pressure sensitive film 33 from the first layer which is the adherend is excellent.

The pressure sensitive adhesive preferably includes a polymer and more preferably includes a (meth)acrylic polymer. Particularly, a polymer (in a case where two or more kinds of monomers, a copolymer) of at least one monomer of (meth)acrylic acid alkyl ester monomers having an alkyl group of 1 to 18 carbon atoms is preferable. The weight-average molecular weight of the (meth)acrylic polymer is preferably 200,000 to 2,000,000.

Examples of the (meth)acrylic acid alkyl ester monomer in which an alkyl group has 1 to 18 carbon atoms include an alkyl (meth)acrylate monomer such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, cyclopentyl (meth)acrylate, cyclohexyl (meth)acrylate, isomyristyl (meth)acrylate, isocetyl (meth)acrylate, isostearyl (meth)acrylate, myristyl (meth)acrylate, cetyl (meth)acrylate, stearyl (meth)acrylate, tetradecyl (meth)acrylate, pentadecyl (meth)acrylate, hexadecyl (meth)acrylate, heptadecyl (meth)acrylate, and octadecyl (meth)acrylate. The alkyl group of the alkyl (meth)acrylate monomer may be linear, branched or cyclic. Two or more of the monomers may be used in combination.

Preferable examples of the (meth)acrylate monomer having an aliphatic ring include cyclopentyl (meth)acrylate, cyclohexyl (meth)acrylate, cycloheptyl (meth)acrylate, and isobornyl (meth)acrylate. Among these, cyclohexyl (meth)acrylate is particularly preferable.

The (meth)acrylic polymer is a copolymer including at least one of (meth)acrylic acid alkyl ester monomers having an alkyl group of 1 to 18 carbon atoms and at least one of other copolymerizable monomers. In this case, examples of the other copolymerizable monomers include a copolymerizable vinyl monomer containing at least one group selected from a hydroxyl group, a carboxyl group, and an amino group, a copolymerizable vinyl monomer having a vinyl group, and an aromatic monomer.

Examples of the copolymerizable vinyl monomer containing a hydroxyl group include hydroxyl group-containing (meth)acrylate esters such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and 8-hydroxyoctyl (meth)acrylate, and hydroxyl group-containing (meth)acrylamides such as N-hydroxy (meth)acrylamide, N-hydroxymethyl (meth)acrylamide, and N-hydroxyethyl (meth)acrylamide, and the copolymerizable vinyl monomer is preferably at least one selected from the group of these compounds.

It is preferable that the content of the copolymerizable vinyl monomer containing a hydroxyl group is 0.1 to 15 parts by mass with respect to 100 parts by mass of the (meth)acrylic polymer.

Examples of the copolymerizable vinyl monomer containing a carboxyl group include (meth)acrylic acid, itaconic acid, crotonic acid, maleic acid, fumaric acid, carboxyethyl (meth)acrylate, and carboxypentyl (meth)acrylate, and at least one selected from the group of these compounds is preferable.

The content of the copolymerizable vinyl monomer containing a carboxyl group is preferably 0.1 to 2 parts by mass with respect to 100 parts by mass of the (meth)acrylic copolymer.

Examples of the copolymerizable vinyl monomer containing an amino group include monoalkylaminoalkyl (meth)acrylate such as monomethylaminoethyl (meth)acrylate, monoethylaminoethyl (meth)acrylate, monomethylaminopropyl (meth)acrylate, and monoethylaminopropyl (meth)acrylate.

Examples of the aromatic monomer include styrene in addition to aromatic group-containing (meth)acrylate esters such as benzyl (meth)acrylate and phenoxyethyl (meth)acrylate.

Examples of the copolymerizable vinyl monomer other than the above include various vinyl monomers such as acrylamide, acrylonitrile, methyl vinyl ether, ethyl vinyl ether, vinyl acetate, and vinyl chloride.

The pressure sensitive adhesive may include a cured product of a composition (also referred to as a pressure sensitive adhesive layer composition) for forming the pressure sensitive adhesive layer.

The pressure sensitive adhesive layer composition preferably includes the polymer and the crosslinking agent, and may be crosslinked by heat, ultraviolet rays (UV), or the like. The crosslinking agent is preferably one or more crosslinking agents selected from a compound group consisting of a difunctional or higher functional isocyanate-based crosslinking agent, a difunctional or higher functional epoxy-based crosslinking agent, and an aluminum chelate-based crosslinking agent. In a case where a crosslinking agent is used, in order to cause the component of the pressure sensitive adhesive not to remain on the surface of the laminate according to the embodiment of the present invention in a case where the pressure sensitive film is peeled off to manufacture the laminate according to the embodiment of the present invention, the content of the crosslinking agent is preferably 0.1 to 15 parts by mass, more preferably 3.5 to 15 parts by mass, and even more preferably 5.1 to 10 parts by mass with respect to 100 parts by mass of the polymer.

The difunctional or higher functional isocyanate compound may be a polyisocyanate compound having at least two isocyanate (NCO) groups in one molecule, and examples thereof include a burette-modified product and an isocyanurate-modified product of diisocyanates (compounds having two NCO groups in one molecule) such as hexamethylene diisocyanate, isophorone diisocyanate, diphenylmethane diisocyanate, tolylene diisocyanate, and xylylene diisocyanate, and an adduct (polyol modified product) with trivalent or higher valent polyols (compounds having at least three OH groups in one molecule) such as trimethylolpropane and glycerin.

A trifunctional or higher functional isocyanate-based compound is a polyisocyanate compound having at least three or more isocyanate (NCO) groups in one molecule, and particularly at least one or more selected from the compound group consisting of an isocyanurate body of a hexamethylene diisocyanate compound, an isocyanurate body of an isophorone diisocyanate compound, an adduct of hexamethylene diisocyanate compound, an adduct of isophorone diisocyanate compound, a burette body of a hexamethylene diisocyanate compound, and a burette body of an isophorone diisocyanate compound are preferable.

The difunctional or higher functional isocyanate-based crosslinking agent is included in an amount of preferably 0.01 to 5.0 parts by mass and more preferably 0.02 to 3.0 parts by mass, with respect to 100 parts by mass of the polymer.

The pressure sensitive adhesive layer composition may contain an antistatic agent in order to provide antistatic performances. The antistatic agent is preferably an ionic compound and more preferably quaternary onium salt.

As the antistatic agent which is a quaternary onium salt, for example, an alkyldimethylbenzyl ammonium salt having an alkyl group having 8 to 18 carbon atoms, a dialkylmethylbenzyl ammonium salt having an alkyl group having 8 to 18 carbon atoms, a trialkylbenzyl ammonium salt having an alkyl group having 8 to 18 carbon atoms, a tetraalkyl ammonium salt having an alkyl group having 8 to 18 carbon atoms, an alkyldimethylbenzyl phosphonium salt having an alkyl group having 8 to 18 carbon atoms, a dialkylmethylbenzyl phosphonium salt having an alkyl group having 8 to 18 carbon atoms, a trialkylbenzyl phosphonium salt having an alkyl group having 8 to 18 carbon atoms, a tetraalkyl phosphonium salt having an alkyl group having 8 to 18 carbon atoms, an alkyl trimethyl ammonium salt having an alkyl group having 14 to 20 carbon atoms, and an alkyldimethyl ethyl ammonium salt having an alkyl group having 14 to 20 carbon atoms can be used. These alkyl groups may be alkenyl groups having an unsaturated bond.

Examples of the alkyl group having 8 to 18 carbon atoms include an octyl group, a nonyl group, a decyl group, a dodecyl group, a tridecyl group, a tetradecyl group, a pentadecyl group, a hexadecyl group, a heptadecyl group, and an octadecyl group. The alkyl group having 8 to 18 carbon atoms may be a mixed alkyl group derived from natural fats and oils. Examples of the alkenyl group having 8 to 18 carbon atoms include an octenyl group, a nonenyl group, a decenyl group, a dodecenyl group, a tridecenyl group, a tetradecenyl group, a pentadecenyl group, a hexadecenyl group, a heptadecenyl group, an octadecenyl group, an oleyl group, and a linoleyl group.

Examples of the alkyl group having 14 to 20 carbon atoms include a tetradecyl group, a pentadecyl group, a hexadecyl group, a heptadecyl group, an octadecyl group, a nonadecyl group, and an icosyl group. The alkyl group having 14 to 20 carbon atoms may be a mixed alkyl group derived from natural fats and oils. Examples of the alkenyl group having 14 to 20 carbon atoms include a tetradecenyl group, a pentadecenyl group, a hexadecenyl group, a heptadecenyl group, an octadecenyl group, an oleyl group, a linoleyl group, a nonadecenyl group, and an icosenyl group.

Examples of a counter anion of the quaternary onium salt include chloride ($Cl^-$), bromide ($Br^-$), methyl sulfate ($CH_3OSO_3^-$), ethyl sulfate ($C_2H_5OSO_3^-$), and paratoluene sulfonate ($p\text{-}CH_3C_6H_4SO_3^-$).

Specific examples of the quaternary onium salt include dodecyl dimethyl benzyl ammonium chloride, dodecyl dimethyl benzyl ammonium bromide, tetradecyl dimethyl benzyl ammonium chloride, tetradecyldimethylbenzyl ammonium bromide, hexadecyl dimethyl benzyl ammonium chloride, hexadecyl dimethyl benzyl ammonium bromide, octadecyl dimethyl benzyl ammonium chloride, octadecyldimethlbenzyl ammonium bromide, trioctylbenzylammonium chloride, trioctylbenzylammonium bromide, trioctylbenzylphosphonium chloride, trioctyl benzylphosphonium bromide, tris(decyl)benzylammonium chloride, tris(decyl)benzylammonium bromide, tris(decyl)benzylphosphonium chloride, tris(decyl)benzylphosphonium bromide, tetraoctyl ammonium chloride, tetraoctyl ammonium bromide, tetraoctylphosphonium chloride, tetraoctylphosphonium bromide, tetranonyl ammonium chloride, tetranonyl ammonium bromide, tetranonyl phosphonium chloride, tetranonyvlphosphonium bromide, tetrakis (decyl)ammonium chloride, tetrakis(decyl)ammonium bromide, tetrakis(decyl)phosphonium chloride, and tetrakis (decyl)phosphonium bromide.

"Tris(decyl)" and "tetrakis (decyl)" respectively mean having three or four decyl groups which are alkyl groups having 10 carbon atoms and is different from a tridecyl group which is an alkyl group having 13 carbon atoms or a tetradecyl group which is an alkyl group having 14 carbon atoms.

As the antistatic agent, in addition to the above, nonionic, cationic, anionic, and amphoteric surfactants, ionic liquid, alkali metal salt, metal oxide, metal fine particles, a conductive polymer, carbon, a carbon nanotube can be used.

Examples of the nonionic surfactant include polyoxyethylene alkyl ethers, polyoxyethylene alkyl phenyl ethers, sorbitan fatty acid esters, polyoxyethylene sorbitan fatty acid esters, polyoxyethylene fatty acid esters, glycerin fatty acid esters, propylene glycol fatty acid esters, and polyoxyalkylene-modified silicones.

Examples of the anionic surfactant include monoalkyl sulfate, alkyl polyoxyethylene sulfates, alkylbenzenesulfonic acid salts, and monoalkyl phosphates.

Examples of the amphoteric surfactant include alkyldimethylamine oxide and alkylcarboxybetaine.

The ionic liquid is a non-polymeric substance including anions and cations and being liquid at room temperature (for example, 25° C.). Examples of the cation portion include a cyclic amidine ion such as an imidazolium ion, a pyridinium ion, an ammonium ion, a sulfonium ion, and a phosphonium ion. Examples of the anion portion include $C_nH_{2n+1}COO^-$, $C_nF_{2n+1}COO^-$, $N_3^-$, $C_nF_{2n+1}SO_3^-$, $(C_nF_{2n+1}SO_2)_2N^-$, $(C_nF_{2n+1}SO_2)_3C^-$, $PO_4^{2-}$, $AlCl_4^-$, $Al_2Cl_7^-$, $ClO_4^-$, $BF_4^-$, $PF_6^-$, $AsF_6^-$, and $SbF_6^-$.

Examples of the alkali metal salt include metal salt including lithium, sodium, and potassium. In order to stabilize ionic substances, a compound containing a polyoxyalkylene structure may be added.

The antistatic agent preferably contains 0.1 to 10 parts by mass with respect to 100 parts by mass of the polymer.

The pressure sensitive adhesive composition can further contain a polyether-modified siloxane compound having HLB of 7 to 15 as an antistatic aid.

HLB is a hydrophilic-lipophilic balance (hydrophilic lipophilicity ratio) defined, for example, by JIS K3211 (surfactant term) and the like.

The pressure sensitive adhesive composition can further contain a crosslinking accelerator. In a case where a polyisocyanate compound is used as a crosslinking agent, the crosslinking accelerator may be a substance, functioning as a catalyst for the reaction (crosslinking reaction) between the copolymer and the crosslinking agent, and examples thereof include an amine-based compound such as tertiary amine, and an organometallic compound such as a metal chelate compound, an organotin compounds, an organic lead compound, organozinc compound. According to the present invention, the crosslinking accelerator is preferably a metal chelate compound or an organotin compound.

The metal chelate compound is a compound obtained by pasting one or more polydentate ligands L to the central metal atom M. The metal chelate compound may or may not have one or more monodentate ligands X pasted to the metal atom M. For example, a formula of a metal chelate compound having one metal atom M is represented by $M(L)_m(X)_n$, $m \geq 1$ and $n \geq 0$. In a case where m is 2 or more, m items of L's may be the same ligands or different ligands. In a case where n is 2 or more, n X's may be the same ligand or different ligands.

Examples of the metal atom M include Fe, Ni, Mn, Cr, V, Ti, Ru, Zn, Al, Zr, and Sn. Examples of the polydentate ligand L include β-ketoester such as methyl acetoacetate, ethyl acetoacetate, octyl acetoacetate, oleyl acetoacetate, lauryl acetoacetate, and stearyl acetoacetate, and β-diketone such as acetylacetone (also referred to as 2,4-pentanedione), 2,4-hexanedione, and benzoylacetone. These are ketoenol tautomeric compounds, and in the polydentate ligand L, enolate obtained by deprotonating enol (for example, acetylacetonate) may be used.

Examples of the monodentate ligand X include a halogen atom such as a chlorine atom and a bromine atom, an acyloxy group such as a pentanoyl group, a hexanoyl group, a 2-ethylhexanoyl group, an octanoyl group, a nonanoyl group, a decanoyl group, a dodecanoyl group, and an octadecanoyl group, and an alkoxy group such as a methoxy group, an ethoxy group, an n-propoxy group, an isopropoxy group, and a butoxy group.

Specific examples of the metal chelate compound include tris(2,4-pentanedionato) iron (III), iron trisacetyl acetonate, titanium trisacetyl acetonate, ruthenium trisacetyl acetonate, zinc bisacetyl acetonate, aluminum trisacetyl acetonate, zirconium tetrakis acetyl acetonate, tris(2,4-hexanedionato) iron (III), bis(2,4-hexanedionato) zinc, tris(2,4-hexanedionato) titanium, tris(2,4-hexanedionato) aluminum, and tetrakis(2,4-hexanedionato) zirconium.

Examples of the organotin compound include dialkyl tin oxide, fatty acid salt of dialkyl tin, and fatty acid salt of stannous tin. A long-chain alkyl tin compound such as a dioctyl tin compound is preferable. Specific examples of the organotin compound include dioctyl tin oxide and dioctyl tin dilaurate.

The content of the crosslinking accelerator is preferably 0.001 to 0.5 parts by mass with respect to 100 parts by mass of the copolymer.

As the pressure sensitive film 33 obtained by forming the pressure sensitive adhesive layer 32 on the support 31, a commercially available protective film can be suitably used. Specific examples thereof include AS3-304, AS3-305, AS3-306, AS3-307, AS3-310, AS3-0421, AS3-0520, AS3-0620, LBO-307. NBO-0424, ZBO-0421, S-362, and TFB-4T3-367AS manufactured by Fujimori Kogyo Co., Ltd.

<<Third Step>>

The third step is a step of burying the particles 13 in the layer 17 obtained by combining the first layer 15 and the pressure sensitive adhesive layer 32 and causing the position of the interface 16 of the pressure sensitive adhesive layer 32 and the first layer 15 to come close (decrease) to the substrate 11 side to protrude from the interface 16 on an opposite side to the interface of the first layer 15 on the substrate.

The expression "the particles are buried in the layer obtained by combining the first layer and the pressure sensitive adhesive layer" indicates that the thickness of the layer 17 obtained by combining the first layer 15 and the pressure sensitive adhesive layer 32 is 0.8 times or more of the average primary particle diameter of the particles 13.

It is preferable that the third step is performed by causing a portion of the curable compound to permeate the substrate 11 (which may be a functional layer, in a case where the substrate has a functional layer) or causing a portion of the curable compound to permeate the pressure sensitive adhesive layer 32.

In the third step, in a case where a portion of the curable compound is caused to permeate the substrate 11 (may be the functional layer, in a case where the support has the functional layer), it is preferable to heat a laminate having the substrate 11, the first layer 15, and the pressure sensitive adhesive layer 32. By the heating, it is possible to cause a portion of the curable compound to effectively permeate the substrate. The temperature in heating is preferably smaller than the glass transition temperature of the substrate. Specifically, the temperature is preferably 60° C. to 180° C. and more preferably 80° C. to 130° C.

In third step, in a case where a portion of the curable compound is caused to permeate a laminate having the pressure sensitive adhesive layer 32, the substrate 11, the first layer 15, and the pressure sensitive adhesive layer 32 is maintained preferably at less than 60° C. and more preferably at 40° C. or less. By maintaining the temperature at 40° C. or less, the viscosity of the curable compound and the pressure sensitive adhesive can be maintained to be high, and at the same time, the thermal motion of the particles can be suppressed, and thus has a high effect of suppressing the decrease of the antireflection performances due to aggregation of the particles and the increase of the haze or the muddiness. The lower limit of the temperature in which the laminate having the substrate 11, the first layer 15, and the pressure sensitive adhesive layer 32 is maintained is not particularly limited, and may be the room temperature or a temperature lower than the room temperature.

<<Fourth Step>>

The fourth step is a step of curing the first layer 15 in a state in which the particles 13 are buried in the layer 17 obtained by combining the first layer 15 and the pressure sensitive adhesive layer 32.

The expression "the particles are buried in the layer obtained by combining the first layer and the pressure sensitive adhesive layer" indicates that the thickness of the layer obtained by combining the first layer and the pressure sensitive adhesive layer is 0.8 times or more of the average primary particle diameter of the particles.

The expression "curing the first layer 15" means polymerizing the curable compound included in the first layer 15, and a binder resin 14 in the completed layer (a) of the laminate can be formed. In the fourth step, since a state in which the particles 13 are buried in the layer 17 obtained by combining the first layer 15 and the pressure sensitive adhesive layer 32 is maintained, the aggregation of the particles 13 are suppressed, and the desired uneven shape can be formed.

In a case where it is considered that the state in which the particles 13 are buried in the layer 17 obtained by combining the first layer 15 and the pressure sensitive adhesive layer 32 is cannot be maintained due to the volatilization of the component of the pressure sensitive adhesive layer 32 or the first layer 15 after the pressure sensitive adhesive layer 32 is provided or the permeation of the component to the substrate 11 (may be the functional layer in a case where the substrate has the functional layer), an operation of thickening the pressure sensitive adhesive layer 32 in advance or the like can be performed.

As a mechanism of suppressing particle aggregation by maintaining a state in which the particles 13 are buried in the layer 17 obtained by combining the first layer 15 and the pressure sensitive adhesive layer 32, it is assumed that, it is known that a large attractive force derived from the surface tension called lateral capillary force works in a case where the particles 13 are exposed to the air interface until the first layer is cured, and thus by burying the fine particles 13 in the layer 17 obtained by combining the first layer 15 and the pressure sensitive adhesive layer 32, the attractive force can be reduced.

The curing can be performed by irradiation with ionizing radiation. The kind of ionizing radiation is not particularly limited, and examples thereof include X-rays, electron beams, ultraviolet rays, visible light, and infrared rays. However, ultraviolet light is widely used. For example, in a case where the coating film is ultraviolet curable, it is preferable that the curable compound of the first layer 15 is cured by being irradiated with ultraviolet rays in an irradiation amount of 10 mJ/cm$^2$ to 1,000 mJ/cm$^2$ by an ultraviolet lamp. The irradiation amount is more preferably 50 mJ/cm$^2$ to 1,000 mJ/cm$^2$ and still more preferably 100 mJ/cm$^2$ to 500 mJ/cm$^2$. At the time of irradiation, the energy may be applied at once or can be applied in a divided manner. As the ultraviolet lamp type, a metal halide lamp, a high pressure mercury lamp, or the like is suitably used.

The oxygen concentration at the curing is preferably 0 to 1.0 vol %, more preferably 0 to 0.1 vol %, and most preferably 0 to 0.05 vol %. In a case where the oxygen concentration at curing is caused to be 1.0 vol % or less, curing inhibition caused by oxygen is hardly received, and the film becomes strong.

In the second to fourth steps, it is preferable that a plurality of particles are not present in a direction orthogonal to the surface of the substrate 11.

In the second to fourth steps, the total film thickness of the film thickness of the first layer 15 and the film thickness of the pressure sensitive adhesive layer 32 is preferably more than the average primary particle diameter of the particles.

It is preferable that the total film thickness of the film thickness of the first layer 15 and the film thickness of the pressure sensitive adhesive layer 32 is more than the average primary particle diameter of the particles 13, since it is possible to cause the particles 13 to be buried in the layer 17 obtained by combining the first layer 15 and the pressure sensitive adhesive layer 32.

However, since it is possible to obtain a shape in which the particles protrude from the surface of the first layer 15 after the pressure sensitive film including the pressure sensitive adhesive layer in the fifth step described below is peeled off, in the fourth step, it is preferable that the film thickness of the first layer 15 is smaller than the average primary particle diameter of the particles 13, and it is more preferable that the film thickness thereof is equal to or less than a half of the average primary particle diameter of the particles 13.

It is preferable that the film thickness of the first layer 15 in the fourth step is adjusted such that the height of the interface 16 opposite to the interface of the layer (a) (a layer including the binder resin 14 in FIG. 2(5)) on the substrate 11 side, which is obtained by curing the first layer is adjusted to be equal to or less than a half of the average primary particle diameter of the particles 13, and it is more preferable that the film thickness thereof is adjusted such that, in a case where the cross section of the first layer is observed by a scanning electron microscope (SEM) and the film thicknesses at 100 random points are measured to obtain the average value, it is preferable to adjust the average value to become 10 nm to 100 nm, more preferably 20 nm to 90 nm, and even more preferably 30 nm to 70 nm.

As the particles 13, those which are the same the particles can be used. Accordingly, the particles 13 are preferably particles and more preferably particles surface-treated for improving the dispersibility in the coating liquid, improving the film hardness, and preventing aggregation. Specific examples and preferable examples of the surface treatment method are in the same manner as those described in <0119> to <0147> of JP2007-298974A.

Particularly, in view of providing the binding properties to the binder component and improving the film hardness, it is preferable that the surface of the particle is surface-modified with a compound having a functional group having reactivity with an unsaturated double bond and the particle surface, and an unsaturated double bond is applied to the particle surface, and it is more preferable that a (meth)acryloyl group is applied.

According to the present invention, the first layer 15 is cured while a state in which the particles 13 are buried in the layer 17 obtained by combining the first layer 15 and the pressure sensitive adhesive layer 32 is maintained in the fourth step, or in the stage before the fourth step, it is preferable to have an uneven shape formed of the particles 13 protruding from the interface 16. In this manner, in a case where the pressure sensitive film 33 is peeled off in the fifth step after the first layer 15 is cured in the fourth step, it is possible to obtain the laminate in a state in which the particles protrudes from the surface of the first layer 15.

In the stage before the fourth step, in order to provide an uneven shape formed of the particles protruding from the interface 16, in the third step described below, it is preferable to cause a portion of the curable compound to permeate the substrate 11 (in a case where the support has a functional layer such as a hard coat layer, a functional layer) or cause a portion of the curable compound to permeate the pressure sensitive adhesive layer 32.

According to the present invention, it is possible to include a step of curing a portion of the curable compound in the first layer 15 between the first and second steps to obtain the cured compound.

In a case where a portion of the curable compound is cured in this step, the particles are caused to hardly move such that the aggregation of the particles can be further suppressed.

The expression "a portion of the curable compound is cured" means that not all of the curable compound is cured, but only a portion thereof is cured. By curing a portion of the curable compound in this step, it is possible to form a desired uneven shape in a case where the position of the interface 16 between the first layer 15 and the pressure sensitive adhesive layer 32 is caused to come close to the substrate 11 side such that the particles 13 protrude from the interface 16 on an opposite side of the interface of the first layer 15 on the substrate 11 side in the third step.

<<Fifth Step>>

The fifth step is a step of peeling off the pressure sensitive film 33 after the fourth step, and the laminate according to the embodiment of the present invention is completed by the first to fifth steps.

[Antireflection Product Having Three-Dimensional Curved Surface]

The antireflection product having a three-dimensional curved surface according to the embodiment of the present invention is an antireflection product having a three-dimensional curved surface, in which a minimum curvature radius of three-dimensional curved surface is 1 to 1,000 mm.

the three-dimensional curved surface has an uneven shape formed of the particles, with respect to the uneven shape, $B_2/A_2$ which is a ratio of the distance $A_2$ between peaks of adjacent protrusions to the distance $B_2$ between the center of the peaks of the adjacent protrusions and a recessed part is 0.4 or more, the number of the particles existing the three-dimensional curved surface is 9 to 40 per 1 $\mu m^2$, and the difference between the maximum value and the minimum value of the reflectivities on the three-dimensional curved surface is smaller than 1.2%. The reflectivity is the average value of values obtained by measuring the wavelength range of 450 nm to 650 nm by an interval of 5 nm.

As described above, a three-dimensional curved surface refers to a curved surface that is not a developable surface. The developable surface refers to a curved surface that can be developed into a plane without expansion and contraction, and is a curved surface that can be formed by bending or cutting a plane.

The curvature radius of the three-dimensional curved surface refers to a curvature radius (minimum curvature radius) of the curve that has the largest curvature in a group of curves that can be obtained in a case where a three-dimensional curved surface is caused to intersect with a plane. The three-dimensional curved surface of the antireflection product having a three-dimensional curved surface according to the embodiment of the present invention may include a curve having a curvature radius larger than the minimum curvature radius in a group of curves which can be obtained in a case where the three-dimensional curved surface is caused to intersect with a plane. The curvature radius of the three-dimensional curved surface can be obtained by obtaining coordinates of the surface shape by a shape scanner and processing the coordinates.

With respect to the antireflection product having a three-dimensional curved surface according to the embodiment of the present invention, the shape of the three-dimensional curved surface may be any one of a convex shape or a concave shape.

The minimum curvature radius of the three-dimensional curved surface of the antireflection product having a three-dimensional curved surface according to the embodiment of the present invention is preferably 1 to 1,000) mm or more preferably 1 to 200 mm.

As described above, the antireflection product having a three-dimensional curved surface according to the embodiment of the present invention can be manufactured by using the antireflection laminate obtained by molding the laminate according to the embodiment of the present invention into a shape having a three-dimensional curved surface.

In the uneven shape formed of the particles in the antireflection product having a three-dimensional curved surface according to the embodiment of the present invention, it is preferable that each particle protruding from a film including a binder resin becomes a protrusion, and a portion in which the particle is not present becomes a recessed part.

In the uneven shape of the antireflection product having a three-dimensional curved surface according to the embodiment of the present invention, it is preferable that $B_2/A_2$ which is the ratio of a distance $A_2$ between the peaks of the adjacent protrusions and a distance $B_2$ between the center between the peaks of the adjacent protrusions and the recessed part is 0.4 or more. In a case where $B_2/A_2$ is 0.4 or more, the refractive index gradient layer in which the depth of the recessed part is greater than the distance between the protrusions and the refractive index gradually and continuously changes from the air to the inside of the antireflection product can be formed, and thus the reflectivity can be further reduced. $B_2/A_2$ is preferably 0.45 or more and more preferably 0.50 or more.

In the antireflection product having a three-dimensional curved surface according to the embodiment of the present invention, the distance $A_2$ is preferably 200 nm to 400 nm, more preferably 220 nm to 300 nm, and even more preferably 240 nm to 280 nm.

The distance $B_2$ is preferably 100 nm to 180 nm, more preferably 110 nm to 160 nm, and even more preferably 120 nm to 150 nm.

In the antireflection product having a three-dimensional curved surface according to the embodiment of the present invention, it is more preferable that the number of particles that are present on the three-dimensional curved surface is 9 to 40 per 1 $\mu m^2$. In a case where the number of particles that are present on the three-dimensional curved surface is 9 to 40 per 1 $\mu m^2$, it is possible to cause the distance $A_2$ to be in a preferable numerical range, so as to achieve low reflectivity.

The uneven shape in the antireflection product having a three-dimensional curved surface according to the embodiment of the present invention is preferably a moth eye structure. Other components such as a binder resin may be present on the surface of the particle that forms the protrusion.

In the antireflection product having a three-dimensional curved surface according to the embodiment of the present invention, the average reflectivity is preferably 1.3% or less. Accordingly, the antireflection function can be caused to be excellent. The average reflectivity is more preferably 1.1% or less and even more preferably 0.9% or less.

Here, in the present specification, the reflectivity is a measured value by the following method.

First, in an antireflection product having a three-dimensional curved surface, the back surface on which the uneven shape is formed is coated with oil-based black ink (magic ink for supplement: Teranishi Chemical Industry Co., Ltd.), such that back surface reflection is eliminated. An adapter ARV-474 is mounted on a spectrophotometer V-550 (manufactured by Jasco Corporation), a side on which the uneven shape of the antireflection product having a three-dimensional curved surface is formed is pressed on an opening for providing a sample, and the integrated sphere reflectivity in the wavelength range of 380 nm to 780 nm is measured at intervals of 5 nm. Among the obtained data, the average value of values measured in the wavelength range of 450 nm to 650 nm at intervals of 5 nm is set as the reflectivity in the present invention.

The average reflectivity of the antireflection product having a three-dimensional curved surface is an average value of values obtained by measuring reflectivities across the sample at intervals of 1 cm along the curve that has the largest curvature in a group of curves that can be obtained in a case where a three-dimensional curved surface is caused to intersect with a plane.

In the antireflection product having a three-dimensional curved surface according to the embodiment of the present invention, the difference between the maximum value and the minimum value of reflectivities in the three-dimensional curved surface is less than 1.2%. Accordingly, the reflectivity unevenness is suppressed, such that the antireflection function can be enhanced. The difference between the maximum value and the minimum value of the reflectivities on the three-dimensional curved surface of antireflection product having a three-dimensional curved surface according to the embodiment of the present invention is preferably 0.70% or less and more preferably 0.50% or less.

The difference of the maximum value and the minimum value of the reflectivity in the three-dimensional curved surface of the antireflection product having a three-dimensional curved surface is a difference between the maximum value and the minimum value among the values obtained by measuring reflectivities across the sample at intervals of 1 cm along the curve that has the largest curvature in a group of curves that can be obtained in a case where a three-dimensional curved surface is caused to intersect with a plane.

The antireflection product having a three-dimensional curved surface according to the embodiment of the present invention can be caused to also have excellent scratch resistance by using metal oxide particles having high particle hardness for forming a moth eye structure.

In the antireflection product having a three-dimensional curved surface according to the embodiment of the present invention, the reflectivity difference before and after rubbing is preferably within 0.2% and more preferably within 0.1% in a scratch resistance test. In this range, the scratch resistance is excellent.

With respect to the scratch resistance in the present specification, steel wool of product number B-204 and a grade (count) #0000 which is manufactured by Nippon Steel Wool Co., Ltd. is wrapped around a front end section of a 1 cm square of a rubbing tester, and in a case where the surface of the antireflection product having a three-dimensional curved surface on a side having an uneven shape is rubbed with a load of 50 g/cm², whether a reflectivity difference between rubbed and non-rubbed portions is within 0.2% is determined to obtain a criterion.

In the antireflection product having a three-dimensional curved surface according to the embodiment of the present invention, the metal oxide particle is the same as the metal oxide particle in the laminate according to the embodiment of the present invention.

Examples of the specific embodiment of the antireflection product having a three-dimensional curved surface according to the embodiment of the present invention include those obtained by applying the antireflection laminate obtained by molding the laminate according to the embodiment of the present invention into a shape having a three-dimensional curved surface to a product having a three-dimensional curved surface.

[Method of Manufacturing Antireflection Product Having Three-Dimensional Curved Surface]

The method of manufacturing the antireflection product having a three-dimensional curved surface is not particularly limited, and examples thereof include a method of manufacturing an antireflection product having a three-dimensional curved surface including a step of pasting the laminate according to the embodiment of the present invention so as to cover at least a partial area of the three-dimensional curved surface of the product having a three-dimensional curved surface and a step of heating the product to which the laminate is pasted to a temperature of the glass transition temperature of the substrate of the laminate or more.

For example, the antireflection product having a three-dimensional curved surface can be manufactured by bending the laminate in a cylindrical shape, fitting the laminate to a product having a predetermined shape, heat-shrinking the laminate by a heat treatment so as to be closely attached (shrinking processing) to follow the product having a predetermined shape. Examples of the method of the heat treatment include a method of heating the laminate by an oven, a method of causing the laminate to pass through a hot air tunnel or a steam tunnel, and a method of heating the laminate with radiant heat such as infrared rays. In addition, a method of treating the laminate with steam (causing the laminate to pass through a heating tunnel filled with steam and vapor) or a method of treating the laminate with dry steam at 100° C. or higher can also be used. With respect to the temperature, the treatment is preferably performed at the glass transition temperature of the substrate or more and is more preferably performed in the range of the glass transition temperature or more and less than the glass transition temperature+30° C. The treatment time of the heat treatment is preferably 1 second to 1 hour, and more preferably 1 to 300 seconds in view of productivity and economy.

The product having a three-dimensional curved surface is not particularly limited, and the examples thereof include an image display device having a three-dimensional curved surface, a windshield and a rear glass of a car, a headlight cover and a tail lamp cover of a car, an in-vehicle sensor and a cover thereof, cover glass of a speed meter, interior parts of a car, glass showcases, and a security camera and a cover thereof.

EXAMPLES

Hereinafter, examples of the present invention are described. The present invention is not limited to the following examples.

<Manufacturing of Substrate>

(Substrate 1: Stretched PMMA)

After a polymethyl methacrylate (PMMA) resin (DELPET 80N manufactured by Asahi Kasei Chemicals Corporation) was dried with a vacuum dryer at 90° C. so as to cause the moisture content to be 0.03% or less, 1.0 part by weight of a ultraviolet absorbing agent (ADEKA STAB LA-31 manufactured by ADEKA Corporation) and 0.3 parts by mass of a stabilizer (IRGANOX 1010 (manufactured by BASF Corporation) was added to 100 mass of a polymethyl methacrylate (PMMA) resin, and mixing was performed with a twin-screw kneader at 230° C., so as to manufacture a PMMA resin pellet.

The PMMA resin pellet manufactured above was melt-extruded from a coat hanger type T-die by using a biaxial extruder to form an un-stretched film. The un-stretched film was simultaneously and biaxially stretched, so as to manufacture a substrate 1. The thickness of the obtained film (the substrate 1) was 40 μm. The stretching ratio was two times vertically and horizontally.

(Substrate 2: Crystalline PET (Polyethylene Terephthalate))

A 38 μm thick COSMO SHINE A-4300 PET (biaxially stretched polyester film, manufactured by Toyobo Co., Ltd.) was used as a substrate 2.

(Substrate 3: Stretched A-PET)

An amorphous polyethylene terephthalate film (manufactured by Mitsubishi Chemical Corporation, trade name "NOVACLEAR A2012", thickness: 200 μm) was prepared, and simultaneously biaxially stretched at a temperature of 90° C. so as to manufacture a substrate 3. The stretching ratio was two times vertically and horizontally. The film thickness of the obtained substrate 3 was 50 μm.

(Substrate 4: Stretched Polystyrene)

A biaxially stretched polystyrene film was used as a substrate 4. The film thickness was 50 μm, and the stretching ratio was two times vertically and horizontally.

(Substrates 5 to 8: Stretched A-PET)

Manufacturing was performed in the same method as in the substrate 3 except that the stretching ratio was changed as presented in Table 1, respectively.

<Forming of Hard Coat Layer>

With respect to Examples 1-11 and 1-12, a hard coat layer was formed.

The substrate was coated with a coating liquid for a hard coat layer, which is described below, by using a die coater. After drying at 30° C. for 90 seconds and then at 60° C. for one minute, nitrogen purging was performed with an air cooling metal halide lamp (manufactured by Eye Graphics Co., Ltd.) of 160 W/cm such that the atmosphere had an oxygen concentration of about 0.3 volume %, the coating layer was cured by being irradiated with ultraviolet rays having an illuminance of 200 mW/cm² and an irradiation dose of 60 mJ/cm² to form a hard coat layer having a thickness of 10 μm. The stretching rate of the hard coat layer of Example 1-11 was 1.5%, and the stretching rate of the hard coat layer of Example 1-12 was 30%.

(Preparation of Coating Liquid for Hard Coat Layer)

Each component was added in the following composition, and the obtained composition was introduced to a mixing tank, stirred, and filtrated with a polypropylene filter having a pore size 0.4 μm so as to obtain coating liquids HC-1 and HC-2 for a hard coat layer.

—Coating Liquid HC-1 for Hard Coat Layer—

| | |
|---|---|
| DPHA (Mixture of dipentaerythritol hexaacrylate and dipentaerythritol pentaacrylate) | 33.6 parts by mass |
| IRGACURE 127 (Photopolymerization initiator, manufactured by BASF Japan Ltd.) | 1.4 parts by mass |
| Methyl ethyl ketone (MEK) | 35.8 parts by mass |
| Methyl acetate | 29.2 parts by mass |

—Coating Liquid HC-2 for Hard Coat Layer—

| | |
|---|---|
| UA-122P (Urethane acrylate, manufactured by Shin-Nakamura Chemical Co., Ltd.) | 33.6 parts by mass |
| IRGACURE 127 (Photopolymerization initiator, manufactured by BASF Japan Ltd.) | 1.4 parts by mass |
| Methyl ethyl ketone (MEK) | 35.8 parts by mass |
| Methyl acetate | 29.2 parts by mass |

[Synthesis of Silica Particle P1]

67.54 kg of methyl alcohol and 26.33 kg of 28 mass % aqueous ammonia (water and catalyst) were introduced to a reactor with capacity of 200 L comprising a stirrer, a dropwise adding device, and a thermometer, and the liquid temperature was adjusted to 33° C. while stirring. On the other hand, a solution prepared by dissolving 12.70 kg of tetramethoxysilane in 5.59 kg of methyl alcohol was introduced to the dropwise adding device. While the liquid temperature in the reactor was maintained to 33° C., the above solution was added dropwise from the dropwise adding device over 37 minutes. After the dropwise addition was completed, stirring was continued while the liquid temperature was maintained to the above temperature for 37 minutes, and hydrolysis and condensation of tetramethoxysilane were performed, so as to obtain a dispersion containing a silica particle precursor. This dispersion was air-dried under the conditions of a heating tube temperature of 175° C. and a reduced pressure degree of 200 torr (27 kPa) by using an instantaneous vacuum evaporator (CRUX SYSTEM CVX-8B model manufactured by Hosokawa Micron Corporation), so as to obtain a silica particle P1.

The average primary particle diameter of the silica particle P1 was 170 nm, the dispersion degree (CV value) of the particle diameter was 7.0%, and the indentation hardness was 340 MPa.

[Manufacturing of Calcined Silica Particle P2]

5 kg of the silica particle P1 was introduced to a crucible, calcined at 900° C. for two hours in an electric furnace, cooled, and then pulverized by using a pulverizer to obtain the calcined silica particle before classification. Disintegration and classification were performed by using a jet pulverizing classifier (IDS-2 model manufactured by Nippon Pneumatic Mfg., Co., Ltd.) to obtain a calcined silica particle P2.

[Manufacturing of silane coupling agent-treated silica particle P3]

5 kg of the calcined silica particle P2 was introduced to a Henschel mixer (FM20J model manufactured by Nippon Coke & Engineering Co., Ltd.) having a capacity of 20 L comprising a heating jacket. A solution obtained by dissolving 50 g of 3-acryloxypropyltrimethoxysilane (KBM 5103 manufactured by Shin-Etsu Chemical Co., Ltd.) in 90 g of methyl alcohol was added dropwise to a portion in which the calcined silica particle P2 was stirred and mixed. Thereafter, the temperature was raised to 150° C. over about one hour while mixing and stirring, and the mixture was maintained at 150° C. for 12 hours, and the heat treatment was performed. Thereafter, in the heat treatment, the attachment on the wall was scraped off while the scraping device was rotated constantly in the opposite direction to the stirring blade. If necessary, the deposits on the wall were scraped off with a spatula. After heating, cooling was performed, and disintegration and classification were performed by using a jet pulverizing classifier, so as to obtain a silane coupling agent treated silica particle P3.

The average primary particle diameter of the silane coupling agent treated silica particle P3 was 171 nm, the dispersion degree (CV value) of the particle diameter was 7.0%, and the indentation hardness was 470 MPa.

[Manufacturing of Silica Particle Dispersion PA-1]

50 g of the silica particle P3 treated with a silane coupling agent, 200 g of MEK, and 600 g of zirconia beads having a diameter of 0.05 mm were introduced in a 1 L bottle having a diameter of 12 cm, set in a ball mill V-2M (IRIE SHOKAI Co., Ltd.), and dispersed for 10 hours at 250 rotation/min. In this manner, a silica particle dispersion PA-1 (concentration of solid content: 20 mass %) was manufactured.

[Manufacturing of Resin Particle Dispersion PA-2]

50 g of EPOSTAR S (average primary particle diameter: 200 nm, melamine-formaldehyde condensate manufactured by Nippon Shokubai Co., Ltd.), 200 g of MEK, and 600 g of zirconia beads having a diameter of 0.05 mm were introduced in a 1 L bottle having a diameter of 12 cm, set in a ball mill V-2M (IRIE SHOKAI Co., Ltd.), and dispersed for 10 hours at 250 rotation/min. In this manner, a resin particle dispersion PA-2 (concentration of solid content: 20 mass %) was manufactured.

[Synthesis of Compound C3]

19.3 g of 3-isocyanatepropyltrimethoxy silane, 3.9 g of glycerin 1,3-bisacrylate, 6.8 g of 2-hydroxyethyl acrylate, 0.1 g of dibutyltin dilaurate, and 70.0 g of toluene were added to a flask equipped with a reflux condenser and a thermometer and were stirred at room temperature for 12 hours. After stirring, 500 ppm of methylhydroquinone was added, and distillation under reduced pressure was performed, so as to obtain compound C3.

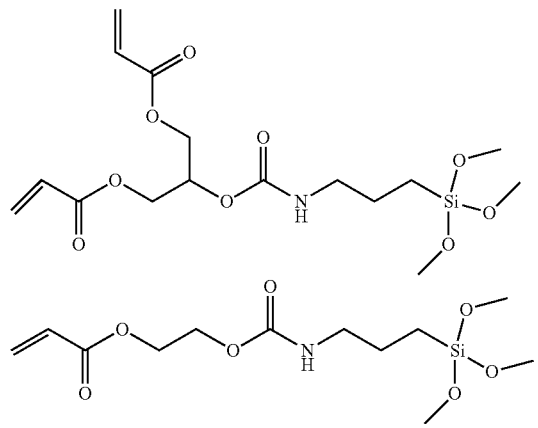

C3

Each component was introduced to a mixing tank so as to have the composition, was stirred for 60 minutes, and was dispersed by an ultrasonic disperser for 30 minutes to prepare compositions A-1 to A-10 for forming the first layer.

Composition A-1 for Forming First Layer

| | |
|---|---|
| U-15HA | 0.9 parts by mass |
| Compound C3 | 0.9 parts by mass |
| Acetyl triethyl citrate | 5.8 parts by mass |
| IRGACURE 127 | 0.1 parts by mass |
| Compound P | 0.03 parts by mass |
| Silica particle dispersion PA-1 | 18.4 parts by mass |
| Compound A | 0.6 parts by mass |
| Ethanol | 16.0 parts by mass |
| Methyl ethyl ketone | 41.5 parts by mass |
| Acetone | 16.0 parts by mass |

U-15 HA and the compound C3 were the curable compound (a1), and acetyl triethyl citrate was a compound for a binder. Acetyl triethyl citrate was a compound without a polymerizable functional group.

The compounds used are provided below.

U-15HA (manufactured by Shin Nakamura Chemical Co., Ltd.): Urethane acrylate

IRGACURE 127: Photopolymerization initiator (manufactured by BASF Japan Ltd.)

Compound P: 2-(4-Methoxyphenyl)-4,6-bis(trichloromethyl)-1,3,5-triazine (photoacid generator, manufactured by Tokyo Chemical Industry Co., Ltd.)

Compound A: F-784-F (Manufactured by DIC Corporation)

Acetyl triethyl citrate, manufactured by Tokyo Chemical Industry Co., Ltd.

Composition A-2 for Forming First Layer

| | |
|---|---|
| U-15HA | 0.3 parts by mass |
| Compound C3 | 0.3 parts by mass |
| Acetyl triethyl citrate | 8.4 parts by mass |
| IRGACURE 127 | 0.04 parts by mass |
| Compound P | 0.02 parts by mass |
| Silica particle dispersion PA-1 | 5.8 parts by mass |
| Compound A | 0.2 parts by mass |
| Ethanol | 16.2 parts by mass |
| Methyl ethyl ketone | 52.7 parts by mass |
| Acetone | 16.2 parts by mass |

Composition A-3 for Forming First Layer

| | |
|---|---|
| U-15HA | 0.4 parts by mass |
| Compound C3 | 0.4 parts by mass |
| Acetyl triethyl citrate | 7.9 parts by mass |
| IRGACURE 127 | 0.05 parts by mass |
| Compound P | 0.01 parts by mass |
| Silica particle dispersion PA-1 | 8.1 parts by mass |
| Compound A | 0.2 parts by mass |
| Ethanol | 16.1 parts by mass |
| Methyl ethyl ketone | 50.6 parts by mass |
| Acetone | 16.1 parts by mass |

Composition A-4 for Forming First Layer

| | |
|---|---|
| U-15HA | 1.0 parts by mass |
| Compound C3 | 1.1 parts by mass |
| Acetyl triethyl citrate | 5.1 parts by mass |
| IRGACURE 127 | 0.1 parts by mass |
| Compound P | 0.03 parts by mass |
| Silica particle dispersion PA-1 | 21.7 parts by mass |
| Compound A | 0.7 parts by mass |
| Ethanol | 15.9 parts by mass |
| Methyl ethyl ketone | 38.5 parts by mass |
| Acetone | 15.9 parts by mass |

Composition A-5 for Forming First Layer

| | |
|---|---|
| U-15HA | 1.2 parts by mass |
| Compound C3 | 1.2 parts by mass |
| Acetyl triethyl citrate | 4.4 parts by mass |
| IRGACURE 127 | 0.2 parts by mass |
| Compound P | 0.03 parts by mass |
| Silica particle dispersion PA-1 | 25.0 parts by mass |
| Compound A | 0.8 parts by mass |
| Ethanol | 15.8 parts by mass |
| Methyl ethyl ketone | 35.6 parts by mass |
| Acetone | 15.8 parts by mass |

Composition A-6 for Forming First Layer

| | |
|---|---|
| U-15HA | 2.6 parts by mass |
| Compound C3 | 0.9 parts by mass |
| Acetyl triethyl citrate | 4.0 parts by mass |
| IRGACURE 127 | 0.1 parts by mass |
| Compound P | 0.03 parts by mass |
| Silica particle dispersion PA-1 | 18.4 parts by mass |
| Compound A | 0.6 parts by mass |
| Ethanol | 16.0 parts by mass |
| Methyl ethyl ketone | 41.5 parts by mass |
| Acetone | 16.0 parts by mass |

Composition A-7 for Forming First Layer

| | |
|---|---|
| U-15HA | 1.7 parts by mass |
| Compound C3 | 0.9 parts by mass |
| Acetyl triethyl citrate | 4.9 parts by mass |
| IRGACURE 127 | 0.1 parts by mass |
| Compound P | 0.03 parts by mass |
| Silica particle dispersion PA-1 | 18.4 parts by mass |
| Compound A | 0.6 parts by mass |
| Ethanol | 16.0 parts by mass |
| Methyl ethyl ketone | 41.5 parts by mass |
| Acetone | 16.0 parts by mass |

Composition A-8 for Forming First Layer

| | |
|---|---|
| U-15HA | 1.3 parts by mass |
| Compound C3 | 0.9 parts by mass |
| Acetyl triethyl citrate | 5.3 parts by mass |
| IRGACURE 127 | 0.1 parts by mass |
| Compound P | 0.03 parts by mass |
| Silica particle dispersion PA-1 | 18.4 parts by mass |
| Compound A | 0.6 parts by mass |
| Ethanol | 16.0 parts by mass |
| Methyl ethyl ketone | 41.5 parts by mass |
| Acetone | 16.0 parts by mass |

Composition A-9 for Forming First Layer

| | |
|---|---|
| U-15HA | 0.6 parts by mass |
| Compound C3 | 0.9 parts by mass |
| Acetyl triethyl citrate | 6.1 parts by mass |
| IRGACURE 127 | 0.1 parts by mass |
| Compound P | 0.03 parts by mass |
| Silica particle dispersion PA-1 | 18.4 parts by mass |
| Compound A | 0.6 parts by mass |
| Ethanol | 16.0 parts by mass |
| Methyl ethyl ketone | 41.5 parts by mass |
| Acetone | 16.0 parts by mass |

Composition A-10 for Forming First Layer

| | |
|---|---|
| U-15HA | 0.6 parts by mass |
| Compound C3 | 0.6 parts by mass |
| Acetyl triethyl citrate | 6.5 parts by mass |
| IRGACURE 127 | 0.08 parts by mass |
| Compound P | 0.02 parts by mass |
| Resin particle dispersion PA-2 | 12.7 parts by mass |
| Compound A | 0.4 parts by mass |
| Ethanol | 16.1 parts by mass |
| Methyl ethyl ketone | 46.9 parts by mass |
| Acetone | 16.1 parts by mass |

<Manufacturing of Laminate>

(First Step: Coating of First Layer)

The substrate was coated with 2.8 ml/m² of the composition for forming a first layer by using a die coater and dried at 30° C. for 90 seconds. The first layer was coated in this manner.

(Second Step: Pasting of Pressure Sensitive Film)

Subsequently, the pressure sensitive film obtained by peeling off a release film from a protective film (MASTAC TFB AS3-304) manufactured by Fujimori Kogyo Co., Ltd. was pasted to the dried first layer such that the pressure sensitive adhesive layer was on the first layer. The pasting was performed at a speed of 1 by using a commercial laminator Bio330 (manufactured by DAE-EL Co.)

The protective film herein refers to a laminate formed of the support/the pressure sensitive adhesive layer/the release film, and a laminate obtained by peeling off the release film from the protective film and formed of the support/the pressure sensitive adhesive layer was a pressure sensitive film.

Details of the protective film used are provided below.

MASTACK TFB AS3-304 (manufactured by Fujimori Kogyo Co., Ltd., Optical protective film with antistatic function) (hereinafter also referred to as "AS3-304")

Support: Polyester film (thickness: 38 μm)

Thickness of pressure sensitive adhesive layer: 20 μm

Maximum transmittance at wavelength of 250 nm to 300 nm in state in which release film was peeled: Less than 0.1%

The transmittance was measured using an ultraviolet-visible-near infrared spectrophotometer UV3150 manufactured by Shimadzu Corporation.

(Third Step: Permeation of Curable Compound)

While the pressure sensitive film was pasted, heating was performed at 120° C. for 15 minutes such that a portion of the curable compound permeated the substrate or the hard coat layer.

(Fourth Step: Curing of First Layer)

Subsequently to the heating, the surface side covered with the first layer of the substrate was irradiated with ultraviolet rays having an illuminance of 200 mW/cm² and an irradiation amount of 300 mJ/cm² by using an air cooling metal halide lamp (manufactured by Eye Graphics Co., Ltd.) of 160 W/cm while purging was performed with nitrogen such that the atmosphere had an oxygen concentration of 0.01 vol % or less, and the first layer was cured so as to form the layer (a).

(Fifth Step: Peeling of Pressure Sensitive Film)

The pressure sensitive film was peeled off from the prepared laminate. After the pressure sensitive film (film obtained by peeling off the release film from MASTACK TFB AS3-304) was peeled off, methyl isobutyl ketone was applied to the surface to which the pressure sensitive film had been pasted, so as to wash out the residue of the pressure sensitive adhesive layer. Thereafter, the film was dried at 25° C. for 10 minutes to obtain a laminate.

Example 1-1

An antireflection film was manufactured by the above manufacturing method by using the substrate 1 as the substrate and using a composition A-1 for forming a first layer.

Examples 1-2, 1-3, 1-9, and 1-10

Manufacturing was performed in the same manner as in Example 1-1 except that the substrate was changed to the substrates 3, 4, 6, and 7, respectively.

Examples 1-4 to 1-8, and 1-13

Manufacturing was performed in the same manner as in Example 1-2 except that the composition for forming the first layer was changed to A-3, A-4, A-7, A-8, A-9, and A-10, respectively.

Example 1-11

Manufacturing was performed in the same manner as in Example 1-2 except that the coating liquid HC-1 for a hard coat layer was used on the substrate so as to form the hard coat layer.

Example 1-12

Manufacturing was performed in the same manner as in Example 1-11, except that the coating liquid HC-2 for a hard coat layer was used.

Comparative Examples 1-1, 1-6, and 1-7

Manufacturing was performed in the same manner as in Example 1-1 except that the substrate was changed to the substrates 2, 5, and 8, respectively.

Comparative Example 1-2

<Forming of Layer of Low Refractive Index>
The substrate 1 was used and was coated with a coating liquid for a layer of low refractive index provided below by using a slot die coater disclosed in FIG. 1 of JP2003-211052A, so as to form a layer of low refractive index having a thickness of 92 nm. The drying conditions of the layer of low refractive index were 90° C. and 30 seconds, and as the ultraviolet curing condition, while nitrogen purging was performed such that the oxygen concentration was an atmosphere of 0.1 volume % or less, an air cooling metal halide lamp (manufactured by Eye Graphics Co., Ltd.) of 240 W/cm was used, and illuminance of 300 mW/cm², and an irradiation amount of 300 mJ/cm².

<Preparation of Coating Liquid for Layer of Low Refractive Index>

(Synthesis of Perfluoroolefin Copolymer (1))

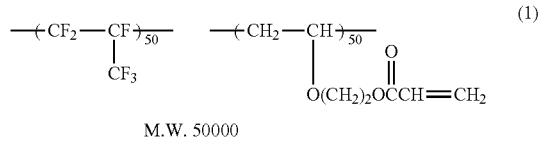

M.W. 50000

In the above structural formula, 50:50 represents a molar ratio.

40 ml of ethyl acetate, 14.7 g of hydroxyethyl vinyl ether, and 0.55 g of dilauroyl peroxide were charged into a stainless-steel autoclave having an inner volume of 100 ml, and the inside of the system was degassed and replaced with nitrogen gas. 25 g of hexafluoropropylene (HFP) was introduced into the autoclave, and the temperature was raised to 65° C. The pressure in a case where the temperature in the autoclave reached 65° C. was 0.53 MPa (5.4 kg/cm²). While the above temperature was maintained, the reaction was continued for eight hours, and in a case where the pressure reached 0.31 MPa (3.2 kg/cm²), heating was stopped and allowed to cool. In a case where the internal temperature decreased to room temperature, unreacted monomers were removed, the autoclave was opened, and the reaction solution was extracted. The obtained reaction solution was poured into a large excess of hexane, and the precipitated polymer was extracted by removing the solvent by decantation. The polymer was dissolved in a small amount of ethyl acetate, and reprecipitation was performed twice, so as to completely remove the residual monomer. After drying, 28 g of a polymer was obtained. Next, 20 g of the above polymer was dissolved in 100 ml of N,N-dimethylacetamide, 11.4 g of acrylic acid chloride was added dropwise under ice cooling, and then the mixture was stirred at room temperature for 10 hours. Ethyl acetate was added to the reaction solution, the mixture was washed with water, the organic layer was extracted and concentrated, and the obtained polymer was reprecipitated with hexane so as to obtain 19 g of a perfluoroolefin copolymer (1). The refractive index of the obtained polymer was 1.422, and the weight average molecular weight was 50,000.

(Preparation of Hollow Silica Particle Dispersion A)

30 parts by mass of acryloyloxy propyltrimethoxysilane and 1.51 parts by mass of diisopropoxyaluminum ethyl acetate were added and mixed with 500 parts by mass of hollow silica particle fine particle sol (isopropyl alcohol silica sol, CS60-IPA manufactured by JGC Catalysts and Chemical Co., Ltd., average particle diameter: 60 nm, shell thickness: 10 nm, silica concentration: 20 mass %, and refractive index of silica particle: 1.31), and then 9 parts by mass of ion exchanged water was added. Reaction was performed at 60° C. for eight hours, then cooling was performed to room temperature, and 1.8 parts by mass of acetylacetone were added to obtain a dispersion. Subsequently, while cyclohexanone was added so that the silica content was substantially constant, the solvent substitution by distillation under reduced pressure was performed at a pressure of 30 Torr, and finally, concentration adjustment was performed, so as to obtain the dispersion A having a concentration of solid contents of 18.2 mass %. The residual amount of IPA in the obtained dispersion A was analyzed by gas chromatography and was 0.5% by mass or less. One Torr is about 133.322 Pa.

<Preparation of Coating Liquid for Layer of Low Refractive Index>

18.0 parts by mass of a perfluoroolefin copolymer (1), 3.0 parts by mass of triacryloyl heptadecafluorononenvl pentaerythritol (the following structural formula) (LINC 3A, manufactured by Kyoeisha Chemical Co., Ltd. (including 35% by mass of pentaerythritol tetraacrylate)), 2.5 parts by mass of reactive silicone (X22-164C, manufactured by Shin-Etsu Chemical Co., Ltd.), 1.5 parts by mass of IRGACURE 127 (manufactured by BASF Japan Ltd.), and 137.4 parts by mass of the hollow silica particle dispersion A were added to methyl ethyl ketone, such that the total content become 1,000 parts by mass, and the filtration was performed with a polypropylene filter having a pore size of 5 μm after stirring, to prepare a coating liquid for a layer of low refractive index.

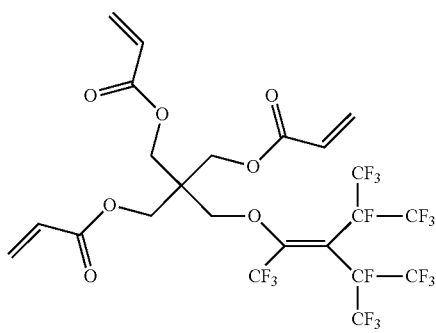

Comparative Examples 1-3 and 1-4

Manufacturing was performed in the same manner as in Example 1-2, except that A-2 and A-5 were used as the composition for forming the first layer, respectively.

Comparative Example 1-5

Manufacturing was performed in the same manner as in Example 1-2, except that A-6 was used as the composition for forming the first layer.

With respect to the laminate obtained by the examples and the comparative examples, the particle number of the particles per 1 $\mu m^2$ on the surface of the layer (a) opposite to the substrate and the distance A between peaks of adjacent protrusions in an uneven shape formed of the particles, and the distance B between the center of the peaks of the adjacent protrusions and the recessed part are specifically described below.

The distances A and B can be measured by SEM observation of a cross section of the laminate. The laminate sample was cut with a microtome to obtain a cross section and SEM observation was performed at a suitable magnification (about 5,000 times). For easier observation, a suitable treatment such as carbon vapor deposition and etching may be applied to the sample. The distance A was calculated as an average value in a case where the distance A between the peaks of the adjacent protrusions was measured at 100 points. The distance B is a distance between a straight line connecting peaks of adjacent protrusions in an in-plane that includes the peaks of adjacent protrusions and is perpendicular to the surface of the substrate at the interface formed by the air and the sample and a recessed part which is a point at which a perpendicular bisector thereof reaches the particle or the binder resin. The distance A, the distance B is also calculated as an average value in a case where 100 points are measured in the same manner.

The number of particles can be measured by SEM observation from the surface of the laminate. For easier observation, a suitable treatment such as carbon vapor deposition and etching may be applied to the sample. A suitable magnification (about 1,000 times) was selected, and a 10 μm×10 μm square range was observed by SEM. The number of particles per unit area can be obtained by detecting the position coordinates of all the metal oxide particles located on the most surface side observed by SEM.

<Method of Measuring Heat Shrinkage Rate of Laminate>

That is, in each manufactured laminate, two reference lines were put on a sample piece cut into 120 mm×35 mm so as to have a distance of 100 mm, and the sample piece is left in for one hour a heating oven at Tg+10° C. under no tension. After this leaving, the sample piece was cooled to room temperature, the distance between the two reference lines was measured, and the value was set as A (unit: mm). The numerical value calculated from the equation "100× (100−A)/100" by using the measured A was set as a heat shrinkage rate.

[Method of Evaluating Laminate]

The evaluation of the laminate was performed as follows.

<Three-Dimensional Curved Surface Moldability>

Three types of stainless steel balls (curvature radius: 100 mm, 500 mm, 1.000 mm) were prepared, the laminate cut out to a size of 80 mm×150 mm was pasted to the surface of each ball, and the heat treatment was performed for five minutes at the glass transition temperature+10° C. In the method of pasting a laminate, the surface of the laminate on the substrate was disposed to face the surface side of the stainless steel ball, and the two central portions of the short side of the cut laminate were pasted to the surface of the ball by using the Kapton tape having heat resistance. At this time, pasting was performed by causing the straight line connecting the centers of the short sides to be in contact with the spherical arc such that the film did not bend. After heating for five minutes, it was determined whether the laminate was able to follow the surface or not according to the following evaluation standards A to D. The three-dimensional surface moldability is high as the laminate was able to follow a mold having a small curvature radius.

A: Able to follow a mold having a curvature radius of 100 mm

B: Able to follow a mold having a curvature radius of 500 mm

C: Able to follow a mold having a curvature radius 1,000 mm

D: Unable to follow a mold having a curvature radius of 1,000 mm

<Manufacturing Antireflection Product Having Three-Dimensional Curved Surface>

With respect to each laminate, a product having a three-dimensional curved surface was manufactured by using a stainless steel ball having a curvature radius of 75 mm. The laminate cut out to a size of 80 mm×150 mm was pasted to the surface of the ball, and the heat treatment was performed for five minutes at the glass transition temperature+10° C. In the method of pasting a laminate, the surface of the laminate on the substrate was disposed to face the surface side of the stainless steel ball, and the two central portions of the short side of the cut laminate were pasted to the surface of the ball by using the Kapton tape having heat resistance. At this time, pasting was performed by causing the straight line connecting the centers of the short sides to be in contact with the spherical arc such that the film did not bend. In this manner, the antireflection product having a three-dimensional curved surface was manufactured.

<Average Reflectivity, in-Plane Distribution of Reflectivity (Maximum Value-Minimum Value of Reflectivity)>

With respect to the obtained antireflection product having a three-dimensional curved surface, the average reflectivity and the in-plane distribution of reflectivity were measured by the following measuring method.

<Scratch Resistance>

A rubbing test was performed on the surface of the obtained antireflection product having a three-dimensional curved surface on the antireflection layer side by using a rubbing tester under the following conditions so as to obtain an index of scratch resistance.

Evaluation environment condition: 25° C. and relative humidity of 60%

Rubbing material: Steel wool (manufactured by Nippon Steel Wool Co., Ltd., Grade No. 0000)

A band was wrapped around a rubbing tip portion (1 cm×1 cm) of the tester in contact with the sample and was fixed.

Travel distance (one way): 13 cm,
Rubbing speed: 13 cm/sec,
Load: 50 g/cm²
Tip portion contact area: 1 cm×1 cm.
Number of rubbing: 10 round trips Oily black ink was applied to the back side of the rubbed sample, and a reflectivity was measured, so as to evaluate scratches on the scrubbed portion.

(Evaluation Standard)

A: The reflectivity difference between a steel wool rubbed portion and a normal part portion (non-rubbed portion) was within Δ0.1%

B: The reflectivity difference between a steel wool rubbed portion and a normal part portion (non-rubbed portion) was more than 0.1% and within Δ0.2%

C: The reflectivity difference between a steel wool rubbed portion and a normal part portion (non-rubbed portion) was more than 0.2% and within Δ0.5%

The configuration and evaluation results of the laminate are presented in Table 1.

TABLE 1

| | Substrate | | | | Composition for forming HC layer | Composition for forming first layer | | Laminate Number of particle | |
|---|---|---|---|---|---|---|---|---|---|
| | Kind | Stretching ratio | Heat shrinkage rate | Tg [° C.] | | Kind | Kind of particle | [particles/μm²] | A [nm] |
| Example 1-1 | Substrate 1 | 2.00 | 50% | 100 | — | A-1 | PA-1 | 16 | 250 |
| Comparative Example 1-1 | Substrate 2 | 1.00 | 0% | 80 | — | A-1 | PA-1 | 16 | 250 |
| Comparative Example 1-2 | Substrate 1 | 2.00 | 50% | 100 | — | — | — | — | — |
| Example 1-2 | Substrate 3 | 2.00 | 50% | 80 | — | A-1 | PA-1 | 16 | 250 |
| Example 1-3 | Substrate 4 | 2.00 | 50% | 90 | — | A-1 | PA-1 | 16 | 250 |
| Comparative Example 1-3 | Substrate 3 | 2.00 | 50% | 80 | — | A-2 | PA-1 | 5 | 447 |
| Example 1-4 | Substrate 3 | 2.00 | 50% | 80 | — | A-3 | PA-1 | 7 | 378 |
| Example 1-5 | Substrate 3 | 2.00 | 50% | 80 | — | A-4 | PA-1 | 19 | 229 |
| Comparative Example 1-4 | Substrate 3 | 2.00 | 50% | 80 | — | A-5 | PA-1 | 22 | 213 |
| Comparative Example 1-5 | Substrate 3 | 2.00 | 50% | 80 | — | A-6 | PA-1 | 16 | 250 |
| Example 1-6 | Substrate 3 | 2.00 | 50% | 80 | — | A-7 | PA-1 | 16 | 250 |
| Example 1-7 | Substrate 3 | 2.00 | 50% | 80 | — | A-8 | PA-1 | 16 | 250 |
| Example 1-8 | Substrate 3 | 2.00 | 50% | 80 | — | A-9 | PA-1 | 16 | 250 |
| Comparative Example 1-6 | Substrate 5 | 1.11 | 10% | 80 | — | A-1 | PA-1 | 16 | 250 |
| Example 1-9 | Substrate 6 | 1.33 | 25% | 80 | — | A-1 | PA-1 | 16 | 250 |
| Example 1-10 | Substrate 7 | 2.85 | 65% | 80 | — | A-1 | PA-1 | 16 | 250 |
| Comparative Example 1-7 | Substrate 8 | 4.00 | 75% | 80 | — | A-1 | PA-1 | 16 | 250 |
| Example 1-11 | Substrate 3 | 2.00 | 50% | 80 | HC-1 | A-1 | PA-1 | 16 | 250 |
| Example 1-12 | Substrate 3 | 2.00 | 50% | 80 | HC-2 | A-1 | PA-1 | 16 | 250 |
| Example 1-13 | Substrate 3 | 2.00 | 50% | 80 | — | A-10 | PA-2 | 16 | 250 |

| | Laminate | | | | Evaluation of laminate and antireflection product having three-dimensional curved surface | | | |
|---|---|---|---|---|---|---|---|---|
| | B [nm] | B/A | Heat shrinkage rate | Heat shrinkage rate measuring temperature [° C.] | Three-dimensional curved surface moldability | Average reflectivity | Maximum value-minimum value of reflectivity | Scratch resistance |
| Example 1-1 | 140 | 0.56 | 50% | 110 | A | 0.80% | 0.60% | B |
| Comparative Example 1-1 | 140 | 0.56 | 0% | 90 | D | 0.30% | 0.10% | B |
| Comparative Example 1-2 | — | — | 50% | 110 | A | 1.00% | 3.00% | B |
| Example 1-2 | 140 | 0.56 | 50% | 90 | A | 0.90% | 0.60% | B |
| Example 1-3 | 140 | 0.56 | 50% | 100 | A | 0.80% | 0.60% | B |
| Comparative Example 1-3 | 140 | 0.31 | 50% | 90 | A | 1.50% | 1.00% | B |
| Example 1-4 | 140 | 0.37 | 50% | 90 | A | 0.80% | 0.50% | B |
| Example 1-5 | 140 | 0.61 | 50% | 90 | A | 0.50% | 0.70% | B |
| Comparative Example 1-4 | 140 | 0.66 | 50% | 90 | A | 0.70% | 1.20% | B |

TABLE 1-continued

| | | | | | | | | |
|---|---|---|---|---|---|---|---|---|
| Comparative Example 1-5 | 80 | 0.32 | 50% | 90 | A | 1.50% | 0.60% | B |
| Example 1-6 | 100 | 0.40 | 50% | 90 | A | 1.20% | 0.50% | B |
| Example 1-7 | 125 | 0.50 | 50% | 90 | A | 1.00% | 0.40% | B |
| Example 1-8 | 150 | 0.60 | 50% | 90 | A | 0.60% | 0.60% | B |
| Comparative Example 1-6 | 140 | 0.56 | 10% | 90 | D | 0.40% | 0.20% | B |
| Example 1-9 | 140 | 0.56 | 25% | 90 | C | 0.80% | 0.60% | B |
| Example 1-10 | 140 | 0.56 | 65% | 90 | B | 0.80% | 0.60% | B |
| Comparative Example 1-7 | 140 | 0.56 | 75% | 90 | D | 0.80% | 0.60% | B |
| Example 1-11 | 140 | 0.56 | 30% | 90 | C | 0.80% | 0.60% | A |
| Example 1-12 | 140 | 0.56 | 50% | 90 | A | 0.80% | 0.60% | A |
| Example 1-13 | 140 | 0.56 | 50% | 90 | A | 1.00% | 0.70% | C |

As presented in Table 1, the laminate according to the embodiment of the present invention had excellent in three-dimensional curved surface moldability, and in a case being applied to an article having a three-dimensional curved surface, the reflectivity was low, the unevenness of the reflectivity was small, and the scratch resistance is was excellent.

In Examples 1-11 and 1-12 in which the hard coat layer was formed, the scratch resistance was excellent.

Example 2-1

As the laminate, the laminate manufactured in Example 1-1 was used, a stainless steel ball having a curvature radius of 75 mm was used, the laminate of Example 1-1 cut out to a size of 80 mm×150 mm was pasted to the surface of the ball, and the heat treatment was performed for five minutes at the glass transition temperature+10° C. In the method of pasting a laminate, the surface of the laminate on the substrate was disposed to face the surface side of the stainless steel ball, and the two central portions of the short side of the cut laminate were pasted to the surface of the ball by using the Kapton tape having heat resistance. At this time, pasting was performed by causing the straight line connecting the centers of the short sides to be in contact with the spherical arc such that the film did not bend. In this manner, the antireflection product having a three-dimensional curved surface was manufactured.

Examples 2-2 and 2-3

Manufacturing was performed in the same manner as in Example 2-1 except that the laminate was changed to laminates manufactured in Examples 1-4 and 1-5, respectively.

Examples 2-4 to 2-7

Manufacturing was performed in the same manner as in Example 2-1 except that stainless steel balls respectively having a curvature radius of 2 mm, 20 mm, 100 mm, and 900 mm were used.

Comparative Examples 2-1 and 2-2

Manufacturing was performed in the same manner as in Example 2-1 except that the laminate was changed to laminates manufactured in Comparative Examples 1-3 and 1-4, respectively.

Examples 3-1 and 3-2

Pasting was performed in the same manner as in Example 2-1 except that the laminate of Example 1-1 cut into a size of 80 mm×150 mm was disposed to a stainless steel ball having a curvature radius of 75 mm, and an overheating treatment was performed for five minutes at the glass transition temperature+10° C. A curved antireflection product having a three-dimensional curved surface was manufactured.

Example 3-2 was manufactured in the same manner as in Example 3-1 except that the laminate of Example 1-5 was used.

Comparative Examples 3-1 and 3-2

Manufacturing was performed in the same manner as in Example 3-1 except that the laminate was changed to laminates manufactured in Comparative Examples 1-3 and 1-4, respectively.

With respect to antireflection products having a three-dimensional curved surface obtained by the above examples and comparative examples, the particle number of particles per 1 $\mu m^2$ of the surface of the three-dimensional curved surface, the distance $A_2$ of peaks of the adjacent protrusions in an uneven shape formed of the particles, and the distance $B_2$ of the center between peaks of the adjacent protrusion and the recessed part were obtained by SEM observation in the same manner as the particle number, A, and B in the laminate.

[Method of Three-Dimensional Curved Surface Product]

In the method of evaluating the laminate according to the embodiment of the present invention, the average reflectivity, the in-plane distribution of reflectivity, and scratch resistance of the three-dimensional curved surface product were evaluated by the same evaluation method as in the evaluation method performed on the three-dimensional curved surface product for evaluation.

The configuration and evaluation results of the three-dimensional curved surface product are presented in Table 2.

TABLE 2

| | Laminate used in manufacturing | Antireflection product having three-dimensional curved surface | | | | | Evaluation of laminate and antireflection product having three-dimensional curved surface | | |
|---|---|---|---|---|---|---|---|---|---|
| | | Curvature radius [mm] | Number of particle [particles/μm²] | $A_2$ [nm] | $B_2$ [nm] | $B_2/A_2$ | Three-dimensional curved surface moldability | Maximum value- minimum value of reflectivity | Scratch resistance |
| Example 2-1 | Example 1-1 | 75 | 25 | 200 | 120 | 0.60 | 0.80% | 0.60% | B |
| Comparative Example 2-1 | Comparative Example 1-3 | 75 | 8 | 350 | 120 | 0.34 | 1.50% | 1.00% | B |
| Example 2-2 | Example 1-4 | 75 | 10 | 300 | 120 | 0.40 | 0.80% | 0.50% | B |
| Example 2-3 | Example 1-5 | 75 | 38 | 183 | 120 | 0.66 | 0.50% | 0.70% | B |
| Comparative Example 2-2 | Comparative Example 1-4 | 75 | 42 | 170 | 120 | 0.71 | 0.70% | 1.20% | B |
| Example 2-4 | Example 1-1 | 2 | 35 | 190 | 100 | 0.53 | 1.20% | 0.40% | B |
| Example 2-5 | Example 1-1 | 20 | 30 | 195 | 110 | 0.56 | 1.00% | 0.50% | B |
| Example 2-6 | Example 1-1 | 100 | 18 | 240 | 130 | 0.54 | 0.80% | 0.30% | B |
| Example 2-7 | Example 1-1 | 900 | 16 | 250 | 140 | 0.56 | 0.60% | 0.10% | B |
| Example 3-1 | Example 1-1 | 75 | 25 | 200 | 120 | 0.60 | 0.90% | 0.60% | B |
| Comparative Example 3-1 | Comparative Example 1-3 | 75 | 8 | 350 | 120 | 0.34 | 1.60% | 1.00% | B |
| Example 3-2 | Example 1-5 | 75 | 38 | 183 | 120 | 0.66 | 0.60% | 0.70% | B |
| Comparative Example 3-2 | Comparative Example 1-4 | 75 | 42 | 170 | 120 | 0.71 | 0.80% | 1.20% | B |

From the results of Table 2, it is understood that the antireflection product having a three-dimensional curved surface according to the embodiment of the present invention had low average reflectivity, small reflectivity unevenness, and excellent scratch resistance.

EXPLANATION OF REFERENCES

10: laminate
11: substrate
12: layer (a)
13: particle
14: binder resin
15: first layer
16: interface
17: layer obtained by combining first layer and pressure sensitive adhesive layer
31: support
32: pressure sensitive adhesive layer
33: pressure sensitive film

What is claimed is:
1. A laminate comprising:
a substrate having a glass transition temperature; and
a layer (a) containing a binder resin and particles,
wherein the layer (a) has an uneven shape formed of the particles on a surface opposite to the substrate,
wherein:
in the uneven shape, B/A which is a ratio of a distance A between peaks of adjacent protrusions and a distance B between a center between the peaks of the adjacent protrusions and a recessed part is 0.35 or more,
the number of particles present on the surface of the layer (a) opposite to the substrate is 6.3 to 20 per 1 μm²,
a heat shrinkage rate of the laminate is 20% or more and less than 70%,
having a three-dimensional curved surface obtained by heating and molding the laminate at the glass transition temperature of the substrate or higher,
the three-dimensional curved surface has the minimum curvature radius of 1 to 1,000 mm and the average reflectivity of 1.3% or less, and
the heat shrinkage rate of the laminate is measured as follows:
the laminate is cut into 120 mm×35 mm to prepare a sample piece,
two reference lines are put on the sample piece so as to have a distance of 100 mm,
the sample piece is left in for one hour in a heating oven at the glass transition temperature+10° C. under no tension,
the sample piece is cooled to room temperature,
the distance between the two reference lines is measured, and a value is set as A having units of mm, and
the heat shrinkage rate is calculated from the equation 100×(100−A)/100 by using the measured A.
2. The laminate according to claim 1,
wherein a heat shrinkage rate of the substrate is 20% or more and less than 70%, and wherein:
the heat shrinkage rate of the substrate is measured as follows:
the substrate is cut into 120 mm×35 mm to prepare a sample piece,
two reference lines are put on the sample piece so as to have a distance of 100 mm,
the sample piece is left in for one hour in a heating oven at the glass transition temperature+10° C. under no tension,
the sample piece is cooled to room temperature,
the distance between the two reference lines is measured, and a value is set as A having units of mm, and
the heat shrinkage rate is calculated from the equation 100×(100−A)/100 by using the measured A.
3. The laminate according to claim 2,
wherein a growth rate of the binder resin is 10% or more, and
the growth rate of the binder resin is measured as follows, wherein:
the binder resin is coated on a glass and peeled from the glass to obtain a coating film having a thickness of 10 μm,
the coating film is cut such that a length in a measurement direction becomes 100 mm and a width becomes 10 mm to prepare a sample, the sample is left for two hours in an environment of 25° C. and a relative humidity of 60%, and immediately after leaving the environment, the sample is stretched at an interlock length of 100 mm and an elongation at a break in a tension rate of 10%/min in an atmosphere of 25° C., and the relative humidity of 60% is measured by using a fully automatic tensile tester manufactured by INTESCO Co. Ltd to obtain the growth rate.

4. The laminate according to claim 3, further comprising:

a hard coat layer between the substrate and the layer (a).

5. The laminate according to claim 4, wherein a growth rate of the hard coat layer is 10% or more, and wherein:

the growth rate of the hard coat layer is measured as follows:

a compound for forming the hard coat layer is coated on a glass and peeled from the glass to obtain a coating film having a thickness of 10 μm, the coating film is cut such that the length in the measurement direction becomes 100 mm and the width becomes 10 mm to prepare a sample, the sample is left for two hours in an environment of 25° C. and a relative humidity of 60%, immediately after leaving the environment, the sample is stretched at the interlock length of 100 mm and the elongation at the break in a tension rate of 10%/min in the atmosphere of 25° C., and the relative humidity of 60% is measured by using a fully automatic tensile tester manufactured by INTESCO Co. Ltd to obtain the growth rate.

6. The laminate according to claim 5, wherein an average primary particle diameter of the particles is 250 nm or less.

7. The laminate according to claim 6, wherein the number of particles present on the surface of the layer (a) opposite to the substrate is 7 to 16 per 1 μm².

8. The laminate according to claim 1, wherein a growth rate of the binder resin is 10% or more, and the growth rate of the binder resin is measured as follows, wherein:

the binder resin is coated on a glass and peeled from the glass to obtain a coating film having a thickness of 10 μm, the coating film is cut such that a length in a measurement direction becomes 100 mm and a width becomes 10 mm to prepare a sample, the sample is left for two hours in an environment of 25° C. and a relative humidity of 60%, and immediately after leaving the environment, the sample is stretched at an interlock length of 100 mm and an elongation at a break in a tension rate of 10%/min in an atmosphere of 25° C., and the relative humidity of 60% is measured by using a fully automatic tensile tester manufactured by INTESCO Co. Ltd to obtain the growth rate.

9. The laminate according to claim 1, further comprising:

a hard coat layer between the substrate and the layer (a).

10. The laminate according to claim 9, wherein a growth rate of the hard coat layer is 10% or more, and wherein:

the growth rate of the hard coat layer is measured as follows:

a compound for forming the hard coat layer is coated on a glass and peeled from the glass to obtain a coating film having a thickness of 10 μm, the coating film is cut such that a length in a measurement direction becomes 100 mm and a width becomes 10 mm to prepare a sample, the sample is left for two hours in an environment of 25° C. and a relative humidity of 60%, and immediately after leaving the environment, the sample is stretched at an interlock length of 100 mm and an elongation at a break in a tension rate of 10%/min in an atmosphere of 25° C., and the relative humidity of 60% is measured by using a fully automatic tensile tester manufactured by INTESCO Co. Ltd to obtain the growth rate.

11. The laminate according to claim 1, wherein an average primary particle diameter of the particles is 250 nm or less.

12. The laminate according to claim 1, wherein the number of particles present on the surface of the layer (a) opposite to the substrate is 7 to 16 per 1 μm².

13. The laminate according to claim 1, wherein the three-dimensional curved surface has the reflectivity difference before and after rubbing of within 0.2% in a scratch resistance test, the scratch resistance test is measured as follows:

steel wool is wrapped around a front end section of a 1 cm square of a rubbing tester, the surface of the three-dimensional curved surface is rubbed with a load of 50 g/cm², a reflectivity difference between rubbed and non-rubbed portions is measured.

14. A method of manufacturing an antireflection product having a three-dimensional curved surface, comprising:

pasting the laminate according to claim 1 so as to cover at least a part of regions of a three-dimensional curved surface of the product having a three-dimensional curved surface, and heating the product to which the laminate is pasted at a temperature equal to or more than the glass transition temperature of the substrate of the laminate.

15. A method of manufacturing an antireflection product having a three-dimensional curved surface, comprising:

pasting the laminate according to claim 7 so as to cover at least a part of regions of a three-dimensional curved surface of the product having a three-dimensional curved surface, and heating the product to which the laminate is pasted at a temperature equal to or more than the glass transition temperature of the substrate of the laminate.

16. A laminate comprising:

a substrate having a glass transition temperature; and a layer (a) containing a binder resin and particles, wherein the layer (a) has an uneven shape formed of the particles on a surface opposite to the substrate, wherein:
in the uneven shape, B/A which is a ratio of a distance A between peaks of adjacent protrusions and a distance B between a center between the peaks of the adjacent protrusions and a recessed part is 0.35 or more,
the number of particles present on the surface of the layer (a) opposite to the substrate is 6.3 to 20 per 1 μm2,
a heat shrinkage rate of the laminate is 20% or more and less than 70%,
having a three-dimensional curved surface obtained by heating and molding the laminate at the glass transition temperature of the substrate or higher,
the three-dimensional curved surface has the minimum curvature radius of 1 to 1,000 mm and the difference between a maximum value and a minimum value of reflectivity of less than 1.2%, and
the heat shrinkage rate of the laminate is measured as follows:
  the laminate is cut into 120 mm×35 mm to prepare a sample piece,
  two reference lines are put on the sample piece so as to have a distance of 100 mm, the sample piece is left in for one hour in a heating oven at the glass transition temperature+10° C. under no tension,
  the sample piece is cooled to room temperature,
  the distance between the two reference lines is measured, and a value is set as A having units of mm,
  the heat shrinkage rate is calculated from the equation 100×(100−A)/100 by using the measured A, and
  the reflectivity is an average value of values obtained by measuring a range of wavelengths of 450 nm to 650 nm at an interval of 5 nm.

17. The laminate according to claim 16,
wherein the three-dimensional curved surface has the reflectivity difference before and after rubbing of within 0.2% in a scratch resistance test,
the scratch resistance test is measured as follows:
steel wool is wrapped around a front end section of a 1 cm square of a rubbing tester,
the surface of the three-dimensional curved surface is rubbed with a load of 50 g/cm$^2$, a reflectivity difference between rubbed and non-rubbed portions is measured.

* * * * *